(12) United States Patent
Wickramasinghe et al.

(10) Patent No.: US 12,190,452 B2
(45) Date of Patent: Jan. 7, 2025

(54) METHOD AND SYSTEM FOR ENFORCING SMOOTHNESS CONSTRAINTS ON SURFACE MESHES FROM A GRAPH CONVOLUTIONAL NEURAL NETWORK

(71) Applicant: ECOLE POLYTECHNIQUE FEDERALE DE LAUSANNE (EPFL), Lausanne (CH)

(72) Inventors: Udaranga Pamuditha Wickramasinghe, Ecublens (CH); Pascal Fua, Vaux-sur-Morges (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 410 days.

(21) Appl. No.: 17/527,255

(22) Filed: Nov. 16, 2021

(65) Prior Publication Data
US 2023/0169732 A1  Jun. 1, 2023

(51) Int. Cl.
*G06T 17/20* (2006.01)
*G06N 3/04* (2023.01)
*G06V 10/75* (2022.01)

(52) U.S. Cl.
CPC ............. *G06T 17/205* (2013.01); *G06N 3/04* (2013.01); *G06V 10/754* (2022.01)

(58) Field of Classification Search
CPC ....... G06T 17/205; G06T 17/30; G06F 30/12; G06N 3/04; G06N 3/0464; G06N 3/0475; G06N 3/0495; G06N 3/0499; G06V 10/754
See application file for complete search history.

(56) References Cited

U.S. PATENT DOCUMENTS

2020/0027269 A1*  1/2020  Jiang ...................... G06T 17/10

OTHER PUBLICATIONS

Nanyang Wang et al., Pixel2Mesh: 3D Mesh Model Generation via Image Guided Deformation, IEEE Transactions on Pattern Analysis and Machine Intelligence ( vol. 43, Issue: 10, Apr. 2, 2020, pp. 3600-3613 (Year: 2010).*

(Continued)

*Primary Examiner* — Phuc N Doan
(74) *Attorney, Agent, or Firm* — Nixon & Vanderhye P.C.

(57) ABSTRACT

A method for enforcing smoothness constraints on surface meshes produced by a Graph Convolutional Neural Network (GCNN) including the steps of reading image data from a memory, the image data including two-dimensional image data representing a three-dimensional object or a three-dimensional image stack of the three-dimensional object, performing a GCNN mesh deformation step on the image data to obtain an approximation of a surface of the three-dimensional object, the surface represented by triangulated surface meshes, at least some vertices of the triangulated surface meshes having a different number of neighboring vertices compared to other vertices in a same triangulated surface mesh, and performing a deep active surface model (DASM) transformation step on the triangulated surface meshes to obtain a corrected representation of the surface of three-dimensional object to improve smoothness of the surface.

13 Claims, 16 Drawing Sheets

(56) References Cited

OTHER PUBLICATIONS

Andrei Jalba et al., An Efficient Morphological Active Surface Model for Volumetric Image Segmentation, Mathematical Morphology and Its Application to Signal and Image Processing pp. 193-204, 2009 (Year: 2009).*
Noha El-Zehiry et al,. An active surface model for volumetric image segmentation, 2009 IEEE International Symposium on Biomedical Imaging: From Nano to Macro, (Year: 2009).*
Udaranga Wickramasinghe et al., Deep Active Surface Models, Computer Vision and Pattern Recognition (cs.CV); Graphics (cs.GR); Machine Learning (cs.LG), arXiv:2011.08826v5, Nov. 2020 (Year: 2020).*
Acuna, D., Kar, A., & Fidler, S. (2019). Devil is in the edges: Learning semantic boundaries from noisy annotations. In Proceedings of the IEEE/CVF Conference on Computer Vision and Pattern Recognition (pp. 11075-11083).
Chang, A. X., Funkhouser, T., Guibas, L., Hanrahan, P., Huang, Q., Li, Z., . . . & Yu, F. (2015). Shapenet: An information-rich 3d model repository. arXiv preprint arXiv:1512.03012.
Chen, Z., & Zhang, H. (2019). Learning implicit fields for generative shape modeling. In Proceedings of the IEEE/CVF Conference on Computer Vision and Pattern Recognition (pp. 5939-5948).
Cheng, D., Liao, R., Fidler, S., & Urtasun, R. (2019). Darnet: Deep active ray network for building segmentation. In Proceedings of the IEEE/CVF Conference on Computer Vision and Pattern Recognition (pp. 7431-7439).
Chibane, J., Alldieck, T., & Pons-Moll, G. (2020). Implicit functions in feature space for 3d shape reconstruction and completion. In Proceedings of the IEEE/CVF Conference on Computer Vision and Pattern Recognition (pp. 6970-6981).
Choy, C. B., Xu, D., Gwak, J., Chen, K., & Savarese, S. (Oct. 2016). 3d-r2n2: A unified approach for single and multi-view 3d object reconstruction. In European conference on computer vision (pp. 628-644). Springer, Cham.
Çiçek, Ö., Abdulkadir, A., Lienkamp, S. S., Brox, T., & Ronneberger, O. (Oct. 2016). 3D U-Net: Learning dense volumetric segmentation from sparse annotation. In International conference on medical image computing and computer-assisted intervention (pp. 424-432). Springer, Cham.
Cohen, L. D., & Cohen, I. (1993). Finite-element methods for active contour models and balloons for 2-D and 3-D images. IEEE Transactions on Pattern Analysis and machine intelligence, 15(11), 1131-1147.
Dong, S., Luo, G., Wang, K., Cao, S., Li, Q., & Zhang, H. (2018). A combined fully convolutional networks and deformable model for automatic left ventricle segmentation based on 3D echocardiography. BioMed research international, 2018.
Duchi, J., Hazan, E., & Singer, Y. (2011). Adaptive subgradient methods for online learning and stochastic optimization. Journal of machine learning research, 12(7).
Fua, P. (1996). Model-based optimization: Accurate and consistent site modeling. In 18th Congress of International Society for Photogrammetry and Remote Sensing (No. CONF).
Fua, P., & Leclerc, Y. G. (1995). Object-centered surface reconstruction: Combining multi-image stereo and shading. International Journal of Computer Vision, 16(1), 35-56.
Gkioxari, G., Malik, J., & Johnson, J. (2019). Mesh r-cnn. In Proceedings of the IEEE/CVF International Conference on Computer Vision (pp. 9785-9795).
Hatamizadeh, A., Sengupta, D., & Terzopoulos, D. (Aug. 2020). End-to-end trainable deep active contour models for automated image segmentation: Delineating buildings in aerial imagery. In European Conference on Computer Vision (pp. 730-746). Springer, Cham.
He, L., Peng, Z., Everding, B., Wang, X., Han, C. Y., Weiss, K. L., & Wee, W. G. (2008). A comparative study of deformable contour methods on medical image segmentation. Image and vision computing, 26(2), 141-163.

Iglovikov, V., & Shvets, A. (2018). Ternausnet: U-net with vgg 11 encoder pre-trained on imagenet for image segmentation. arXiv preprint arXiv:1801.05746.
Jorstad, A., Nigro, B., Cali, C., Wawrzyniak, M., Fua, P., & Knott, G. (2015). NeuroMorph: a toolset for the morphometric analysis and visualization of 3D models derived from electron microscopy image stacks. Neuroinformatics, 13(1), 83-92.
Kass, M., Witkin, A., & Terzopoulos, D. (1988). Snakes: Active contour models. International journal of computer vision, 1(4), 321-331.
Kavur, A. E., Gezer, N. S., Bar, M., Aslan, S., Conze, P. H., Groza, V., . . . & Selver, M. A. (2021). CHAOS challenge-combined (CT-MR) healthy abdominal organ segmentation. Medical Image Analysis, 69, 101950.
Kingma, D. P., & Ba, J. (2014). Adam: A method for stochastic optimization. arXiv preprint arXiv:1412.6980.
Lengagne, R., Fua, P., & Monga, O. (2000). 3D stereo reconstruction of human faces driven by differential constraints. Image and Vision Computing, 18(4), 337-343.
Lengagne, R., Monga, O., & Fua, P. (1997, June). Using differential constraints to reconstruct complex surfaces from stereo. In Proceedings of IEEE Computer Society Conference on Computer Vision and Pattern Recognition (pp. 1081-1086). IEEE.
Leventon, M. E., Grimson, W. E. L., & Faugeras, O. (Jun. 2000). Statistical Shape Influence in Geodesic Active Contours. In Proceedings IEEE Conference on Computer Vision and Pattern Recognition. CVPR 2000 (Cat. No. PR00662) (vol. 2, pp. 1316-1316). IEEE Computer Society.
Liang, J., Homayounfar, N., Ma, W. C., Xiong, Y., Hu, R., & Urtasun, R. (2020). Polytransform: Deep polygon transformer for instance segmentation. In Proceedings of the IEEE/CVF Conference on Computer Vision and Pattern Recognition (pp. 9131-9140).
Ling, H., Gao, J., Kar, A., Chen, W., & Fidler, S. (2019). Fast interactive object annotation with curve-gcn. In Proceedings of the IEEE/CVF Conference on Computer Vision and Pattern Recognition (pp. 5257-5266).
Lorensen, W. E., & Cline, H. E. (1987). Marching cubes: A high resolution 3D surface construction algorithm. ACM siggraph computer graphics, 21(4), 163-169.
Marcos, D., Tuia, D., Kellenberger, B., Zhang, L., Bai, M., Liao, R., & Urtasun, R. (2018). Learning deep structured active contours end-to-end. In Proceedings of the IEEE Conference on Computer Vision and Pattern Recognition (pp. 8877-8885).
McInerney, T., & Terzopoulos, D. (1995). A dynamic finite element surface model for segmentation and tracking in multidimensional medical images with application to cardiac 4D image analysis. Computerized medical imaging and graphics, 19(1), 69-83.
Mescheder, L., Oechsle, M., Niemeyer, M., Nowozin, S., & Geiger, A. (2019). Occupancy networks:. Learning 3d reconstruction in function space. In Proceedings of the IEEE/CVF Conference on Computer Vision and Pattern Recognition (pp. 4460-4470).
Milletari, F., Navab, N., & Ahmadi, S. A. (2016). V-net: Fully convolutional neural networks for volumetric medical image segmentation. In 2016 fourth international conference on 3D vision (3DV) (pp. 565-571). IEEE.
Newman, T. S., & Yi, H. (2006). A survey of the marching cubes algorithm. Computers & Graphics, 30(5), 854-879.
Pan, J., Han, X., Chen, W., Tang, J., & Jia, K. (2019). Deep mesh reconstruction from single RGB images via topology modification networks. In Proceedings of the IEEE/CVF International Conference on Computer Vision (pp. 9964-9973).
Park, J. J., Florence, P., Straub, J., Newcombe, R., & Lovegrove, S. (2019). Deepsdf: Learning continuous signed distance functions for shape representation. In Proceedings of the IEEE/CVF Conference on Computer Vision and Pattern Recognition (pp. 165-174).
Peng, S., Jiang, W., Pi, H., Li, X., Bao, H., & Zhou, X. (2020). Deep snake for real-time instance segmentation. In Proceedings of the IEEE/CVF Conference on Computer Vision and Pattern Recognition (pp. 8533-8542).
Prevost, R., Cuingnet, R., Mory, B., Cohen, L. D., & Ardon, R. (Sep. 2013). Incorporating shape variability in image segmentation via implicit template deformation. In International Conference on Medi-

(56) References Cited

OTHER PUBLICATIONS cal Image Computing and Computer-Assisted Intervention (pp. 82-89). Springer, Berlin, Heidelberg.
Remelli, E., Lukoianov, A., Richter, S. R., Guillard, B., Bagautdinov, T., Baque, P., & Fua, P. (2020). Meshsdf: Differentiable iso-surface extraction. arXiv preprint arXiv:2006.03997.
Shvets, A. A., Rakhlin, A., Kalinin, A. A., & Iglovikov, V. I. (Dec. 2018). Automatic instrument segmentation in robot-assisted surgery using deep learning. In 2018 17th IEEE International Conference on Machine Learning and Applications (ICMLA) (pp. 624-628). IEEE.
Terzopoulos, D., Witkin, A., & Kass, M. (1988). Constraints on deformable models: Recovering 3D shape and nonrigid motion. Artificial intelligence, 36(1), 91-123.
Terzopoulos, D., Witkin, A., & Kass, M. (1988). Symmetry-seeking models and 3D object reconstruction. International Journal of Computer Vision, 1(3), 211-221.
Wang, N., Zhang, Y., Li, Z., Fu, Y., Liu, W., & Jiang, Y. G. (2018). Pixel2mesh: Generating 3d mesh. Models from single rgb images. In Proceedings of the European Conference on Computer Vision (ECCV) (pp. 52-67).
Wen, C., Zhang, Y., Li, Z., & Fu, Y. (2019). Pixel2mesh++: Multi-view 3d mesh generation via deformation. In Proceedings of the IEEE/CVF International Conference on Computer Vision (pp. 1042-1051).
Wickramasinghe, U., Fua, P., & Knott, G. (2021). Deep Active Surface Models. In Proceedings of the IEEE/CVF Conference on Computer Vision and Pattern Recognition (pp. 11652-11661).
Wickramasinghe, U., Remelli, E., Knott, G., & Fua, P. (Oct. 2020). Voxel2mesh: 3d mesh model generation from volumetric data. In International Conference on Medical Image Computing and Computer-Assisted Intervention (pp. 299-308). Springer, Cham.
Xu, Q., Wang, W., Ceylan, D., Mech, R., & Neumann, U. (2019). DISN: Deep implicit surface network for high-quality single-view 3d reconstruction. arXiv preprint arXiv:1905.10711.

* cited by examiner (a) Ground truth (b) Input (c) 1-step (d) 3-steps (e) 5-steps (f) 7-steps

| | Chf. | Normal | $F^{0.1}$ | $F^{0.3}$ | $F^{0.5}$ |
|---|---|---|---|---|---|
| Pixel2Mesh | 0.241 | 0.701 | 31.6 | 77.3 | 91.3 |
| Mesh R-CNN | 0.189 | 0.691 | 32.8 | 80.4 | 92.6 |
| Ad.-DASM | 0.183 | 0.727 | 33.5 | 81.0 | 92.6 |

Table 1: Comparative results on ShapeNet.

| $\lambda_e$ | | Chf. | Normal | $F^{0.1}$ | $F^{0.3}$ | $F^{0.5}$ |
|---|---|---|---|---|---|---|
| 1.0 | Mesh R-CNN | 0.232 | 0.684 | 29.7 | 76.6 | 89.4 |
| | Ad.-DASM | 0.231 | 0.691 | 29.3 | 76.6 | 89.3 |
| 0.6 | Mesh R-CNN | 0.212 | 0.681 | 30.6 | 79.2 | 91.4 |
| | Ad.-DASM | 0.206 | 0.693 | 31.4 | 79.5 | 91.4 |
| 0.2 | Mesh R-CNN | 0.189 | 0.691 | 32.8 | 80.4 | 92.6 |
| | Ad.-DASM | 0.183 | 0.727 | 33.5 | 81.0 | 92.6 |
| 0.0 | Mesh R-CNN | 0.144 | 0.713 | 35.8 | 85.1 | 94.2 |
| | Ad.-DASM | 0.167 | 0.718 | 34.3 | 84.3 | 93.9 |

Table 2: Results on ShapeNet as a function of $\lambda_e$.

FIG. 6B

| | Chf. | Normal | $F^{0.1}$ | $F^{0.3}$ | $F^{0.5}$ |
|---|---|---|---|---|---|
| PostProc-ASM | 0.249 | 0.673 | 28.5 | 75.3 | 88.1 |
| Uniform-DASM | 0.201 | 0.699 | 31.4 | 78.3 | 91.3 |
| Ad.-DASM | 0.183 | 0.727 | 33.5 | 81.0 | 92.6 |

Table 3: Ablation study on ShapeNet.

FIG. 6C

|  | Pre-Syn. | Synapse | Post-Syn. |
|---|---|---|---|
| TernausNet [17] | 73.5 ± 1.3 | 64.4 ± 0.5 | 78.4 ± 1.3 |
| LinkNet34 [37] | 72.3 ± 0.5 | 63.2 ± 1.2 | 78.2 ± 1.1 |
| ResNet50 [2] | 70.3 ± 0.8 | 63.3 ± 0.6 | 76.2 ± 1.4 |
| ResNet50-SE [2] | 71.3 ± 0.6 | 63.6 ± 0.7 | 76.3 ± 0.9 |
| V-NET [30] | 64.3 ± 0.7 | 65.2 ± 1.3 | 74.1 ± 0.7 |
| U-NET [8] | 73.6 ± 1.3 | 67.2 ± 0.8 | 78.2 ± 0.9 |
| Voxel2Mesh$_{0.025}$ | 77.3 ± 1.2 | 65.3 ± 1.2 | 83.2 ± 1.6 |
| Voxel2Mesh$_{0.035}$ | 76.8 ± 0.9 | 65.4 ± 1.6 | 81.2 ± 1.4 |
| Ad.-DASM$_{0.025}$ | 77.7 ± 0.8 | 65.3 ± 0.7 | 83.3 ± 0.8 |
| Ad.-DASM$_{0.035}$ | 79.4 ± 1.4 | 65.3 ± 0.9 | 85.5 ± 1.2 |

FIG. 10A

|  | Pre-Syn. | Synapse | Post-Syn. |
|---|---|---|---|
| Voxel2Mesh$_{0.025}$ | 1.62 ± 0.4 | 0.19 ± 0.2 | 2.41 ± 0.7 |
| Voxel2Mesh$_{0.035}$ | 1.53 ± 0.6 | 0.18 ± 0.4 | 2.35 ± 0.4 |
| Ad.-DASM$_{0.025}$ | 1.59 ± 0.5 | 0.19 ± 0.3 | 2.39 ± 0.8 |
| Ad.-DASM$_{0.035}$ | 1.47 ± 0.6 | 0.18 ± 0.5 | 2.31 ± 0.6 |

FIG. 10B

|  | Time (sec.) | |V| |
|---|---|---|
| Voxel2Mesh | 1.06 ± 0.04 | 1534 ± 4 |
| Ad.-DASM | 1.47 ± 0.06 | 1535 ± 2 |

FIG. 10C

| $\lambda_r$ | | Chf ($\downarrow$) | Edg. Length | Surf. Lap. |
|---|---|---|---|---|
| 1.0 | Mesh R-CNN | 0.232 | 0.023 ± 0.011 | 0.033 ± 0.031 |
| | Ad.-DASM | 0.231 | 0.022 ± 0.009 | 0.023 ± 0.019 |
| 0.6 | Mesh R-CNN | 0.212 | 0.024 ± 0.015 | 0.045 ± 0.045 |
| | Ad.-DASM | 0.206 | 0.023 ± 0.011 | 0.029 ± 0.020 |
| 0.2 | Mesh R-CNN | 0.189 | 0.028 ± 0.021 | 0.066 ± 0.075 |
| | Ad.-DASM | 0.183 | 0.025 ± 0.015 | 0.037 ± 0.049 |
| 0.0 | Mesh R-CNN | 0.144 | 0.141 ± 0.142 | 0.708 ± 0.671 |
| | Ad.-DASM | 0.167 | 0.070 ± 0.072 | 0.254 ± 0.276 |

FIG. 13

METHOD AND SYSTEM FOR ENFORCING SMOOTHNESS CONSTRAINTS ON SURFACE MESHES FROM A GRAPH CONVOLUTIONAL NEURAL NETWORK

FIELD OF THE INVENTION

The herein presented invention is directed to the field of three-dimensional (3D) computer graphics, more specifically the performance of data processing on triangulated meshes for representing three-dimensional surfaces, for example 3D active surface models that have been subjected to deep learning networks, for example graph convolutional networks.

BACKGROUND

Triangulated meshes are one of the most popular and versatile kind of 3D surface representation. In recent years, one of the most popular approaches to inferring such representations from images has been to use deep networks to produce a volumetric representation and then running a marching-cube style algorithm to create the mesh. However, using marching cubes tends to introduce artifacts and introduces additional complexities when trying to make the process end-to-end differentiable. Accordingly, deep-learning methods that go directly and without resorting to an intermediate stage from 2D images and 3D image stacks to 3D triangulated surfaces have recently been proposed.

Unfortunately, these direct methods are also prone to generating unwanted artifacts such as those shown at the top of FIG. 1. Background art methods handle them by introducing additional regularizing loss terms such as the edge length loss, the normal consistency loss, or the Laplacian loss during training. To be effective without sacrificing reconstruction accuracy, these terms must be carefully weighted, which is typically difficult to achieve.

Accordingly, despite the progress in the field of refinements and data processing for improving triangulated meshes, further improvements are strongly desired, to improve the graphic representations of the underlying objects, to preserve the reconstruction accuracy, to reduce presence of undesired artifacts, and to improve data processing time.

SUMMARY

According to one aspect of the present invention, a method for enforcing smoothness constraints on surface meshes produced by a Graph Convolutional Neural Network (GCNN) is provided. Preferably, the method is performed on a data processor of a computer, and preferably includes the steps of reading image data from a memory, the image data including two-dimensional image data representing a three-dimensional object or a three-dimensional image stack of the three-dimensional object, performing a GCNN mesh deformation step on the image data to obtain an approximation of a surface of the three-dimensional object, the surface represented by triangulated surface meshes, at least some vertices of the triangulated surface meshes having a different number of neighboring vertices compared to other vertices in a same triangulated surface mesh, and performing a deep active surface model (DASM) transformation step on the triangulated surface meshes to obtain a corrected representation of the surface of three-dimensional object to improve smoothness of the surface.

According to another aspect of the presented invention, a non-transitory computer readable medium (CRM) having computer code recorded thereon is provided, the computer code configured to perform a method for enforcing smoothness constraints on surface meshes produced by a Graph Convolutional Neural Network (GCNN), when the computer code is executed on a data processor of a computer. According to still another aspect of the invention, a computer device having a data processor and memory is provided, the data processor being configured to perform a method for enforcing smoothness constraints on surface meshes produced by a Graph Convolutional Neural Network (GCNN).

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE SEVERAL VIEWS OF THE DRAWINGS

FIG. 5 show an original 3D object represented by an ideal mesh (a), a first noisy mesh generated by the Mesh R-CNN algorithm with mesh (b), and results from the performance of iterative smoothing steps with meshes (c) to (f) when performing multiple smoothing steps according to the herein presented method. First, the method can start with a very noisy mesh produced by the Mesh R-CNN algorithm, being a GCNN process described also as step S20, without regularization. After running one step of surface evolution with step S30 given by Equation 6, we obtain the mesh (c). Subsequent meshes shown with meshes (d), (e), and (f) are obtained by continuing the surface evolution for three (3), five (5), and seven (7) steps respectively. In these subsequent steps we set $F(\Phi^{t-1})$ to zero;

FIGS. 6A-6C show different tables having data with comparative results, with FIG. 6A showing a table 1 with comparative data results on ShapeNet, FIG. 6B shows a table 2 with data results on ShapeNet as a function of $\lambda_e$, and FIG. 6C showing a table 3 data on an ablation study on ShapeNet;

FIGS. 10A to 10C show data in different tables showing comparative results, with FIG. 10A showing a table 4 with comparative results on CortexEM. We use the IoU metric to compare volumetric segmentations, FIG. 10B showing a table 5 with comparative results on CortexEM. We use the Chamfer distance ($\times 10^{-2}$), and FIG. 10C showing a table 6 with different run times. We report the time required to perform a forward and backward pass. |V| is the number of mesh vertices;

FIG. 13 shows a table 7 with the results on ShapeNet as a function of $\lambda_{edge}$, this table 7 being an extension of table 2 of FIG. 6B.

Herein, identical reference numerals are used, where possible, to designate identical elements that are common to the figures. Also, the images in the drawings are simplified for illustration purposes and may not be depicted to scale.

DETAILED DESCRIPTION OF THE SEVERAL EMBODIMENTS

Figure 2A:
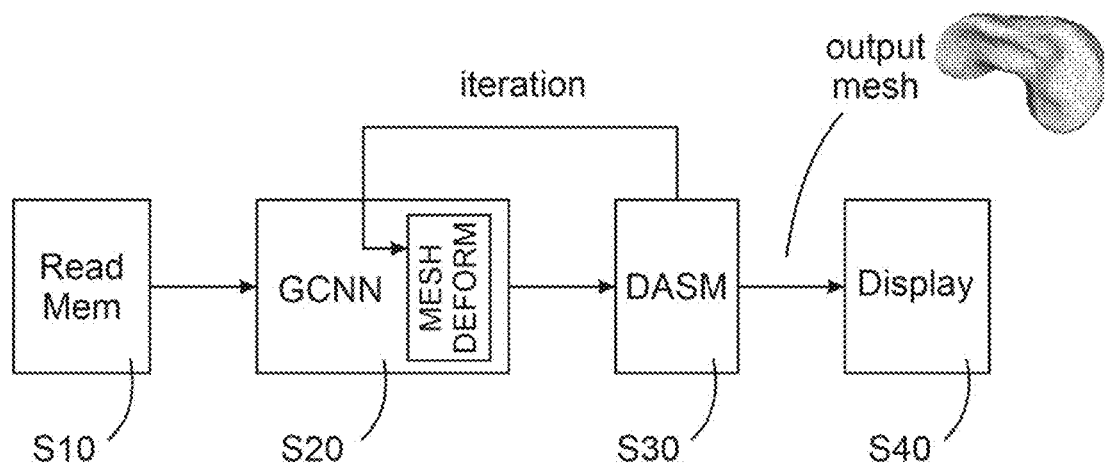
FIGS. 2A to 2D show exemplary and simplified flowcharts of different aspects of the herein presented method, with FIG. 2A showing a simplified flowchart of the method, FIG. 2B showing a flowchart with different steps of the method for the prediction of 3D surfaces from 2D images according to the state of the art using the Mesh R-CNN architecture, FIG. 2C showing a flowchart with different steps of the method for the prediction of 3D surfaces from 3D image stacks according to the state of the art using Voxel2Mesh architecture, for example but not limited to medical imaging stacks from a medical imaging device such as a CT or MRI scanner, and FIG. 2D showing a simplified view of the herein presented deep active surface model (DASM) transformation step embedded into the Graph Convolutional Neural Network (GCNN) with a graph convolutional. And a mesh un-pooling step.

FIG. 2A shows a schematic view of the method for enforcing smoothness constraints on surface meshes produced by a Graph Convolutional Neural Network (GCNN) as a simplified flowchart. First a, a step S10 can be performed, where image data is read from a memory, for example the memory a data processing device 20 as exemplary illustrated with the computer system of FIG. 14. The image data can include two-dimensional image data representing a three-dimensional object, or a three-dimensional image stack of the three-dimensional object, for example originating from a medical imaging device. It is also possible that the image data originates from a camera 10 that has or is capturing image data of a three-dimensional object. For example, with step S10, it is possible to read image data from the memory, the image data representing three-dimensional image stacks of a three-dimensional object, and the three-dimensional image stack includes image body slice data from a medical imaging device 70. Next, a step S20 can be performed where the read image data is subject to a GCNN mesh deformation step to obtain an approximation of a surface of the three-dimensional object, the surface represented by triangulated surface meshes. Specifically, at least some vertices of the triangulated surface meshes having a different number of neighboring vertices compared to other vertices in a same triangulated surface mesh, thereby having a irregularly-sized meshes. Thereafter, a step S30 can be performed, where a deep active surface model (DASM) transformation step on the triangulated surface meshes is performed to obtain a corrected representation of the surface of three-dimensional object to improve smoothness of the surface. Optionally, a step S40 can be performed where results of the deep active surface model (DASM) transformation step are displayed on a display device or screen 22, for example a rendering of a two-dimensional or three-dimensional representation of three-dimensional object with an improved surface smoothness, or other intermediary results or input data, for example the original, non-smoothed mesh.

Moreover, the DASM transformation step S30 is performed after a graph convolution step of the GCNN mesh deformation step S20. As shown schematically in FIG. 2A, iterations can be performed, where the step of performing the GCNN mesh deformation step S20 and the step of performing the DASM transformation step S30 are repeated for iterative correction of the surface of three-dimensional object, as illustrated exemplarily in FIG. 5 with a 3D representation of a vehicle, to improve surface smoothness by surface evolution. Preferably, the DASM transformation step S30 uses a first order and second order derivative at locations of each vertex of the surface of the three-dimensional object to filter out rough edges of the surface, as illustrated schematically and exemplarily in FIG. 3.

Specifically, the DASM transformation step can further comprise a step of computing different discrete positions around a vertex of triangulated surface meshes, a number of discrete positions being constant irrespective of a number of neighboring vertices of the vertex. This aspect is visualized in FIG. 11, seven (7) exemplary vertices are shown, having a different number of neighboring meshes and vertices, varying between four (4) and ten (10), thereby having a different number of neighboring vertices. Irrespective of the exemplary and non-limiting degree number from four (4) and ten (10), a constant number of discrete positions are used to determine the surface shapes at the respective vertex. In the variant shown, a matrix of twelve (12) discrete positions are used, other than a position of the specific vertex itself, having the same arrangement and pitch for every vertex, regardless or irrespective its number of neighboring vertices. Next, a step is performed where surface derivates are calculated at the specific vertex by using the different discrete positions, for example in the variant shown the positions of the different dots of matrix, the matrix representing exemplary twelve (12) different discrete positions. This allows to determine a surface roughness or property at the vertex with a number of discrete positions, to simplify this calculation task. Next, a step of defining a cost or energy function is performed, by using the computed surface derivatives of the previous step. The cost or energy function is associated with the surface defined by the triangulated surface meshes. In active surface literature, the cost function is commonly referred to as the energy function, and these terms are interchangeably used within this patent specification, and is shown in Equation 2 below with E(Φ). Thereafter, it is possible to perform a step of minimizing a cost or an energy of the cost or energy function to obtain a corrected representation of the surface. For example, step of minimizing can be performed by iteratively solving a Euler-Lagrange equation associated with the surface to determine the corrected representation of the surface, as expressed below in Equation 4.

In other words, with the herein presented DASM transformation step, a mapping can be performed to calculate an approximation of the surface towards the corrected representation of the surface, in which vertices are moved towards the surface to satisfy a Euler-Lagrange equation associated with the cost or energy function.

Figure 2B:
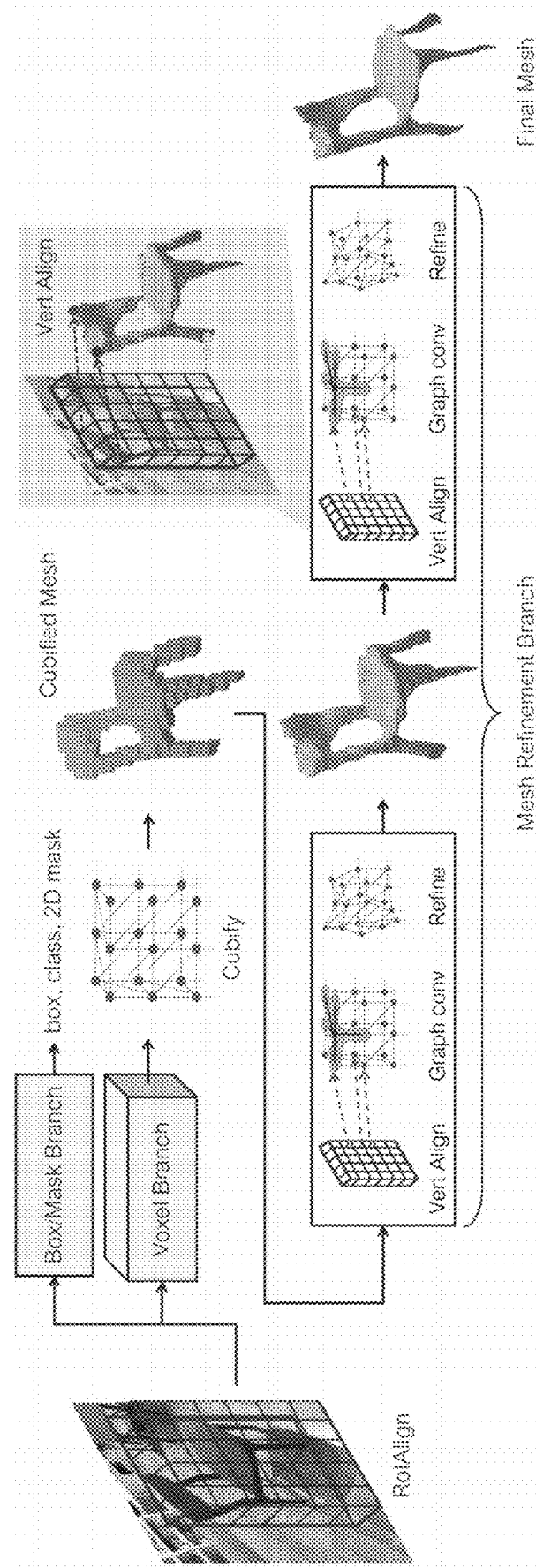
Figure 2C:
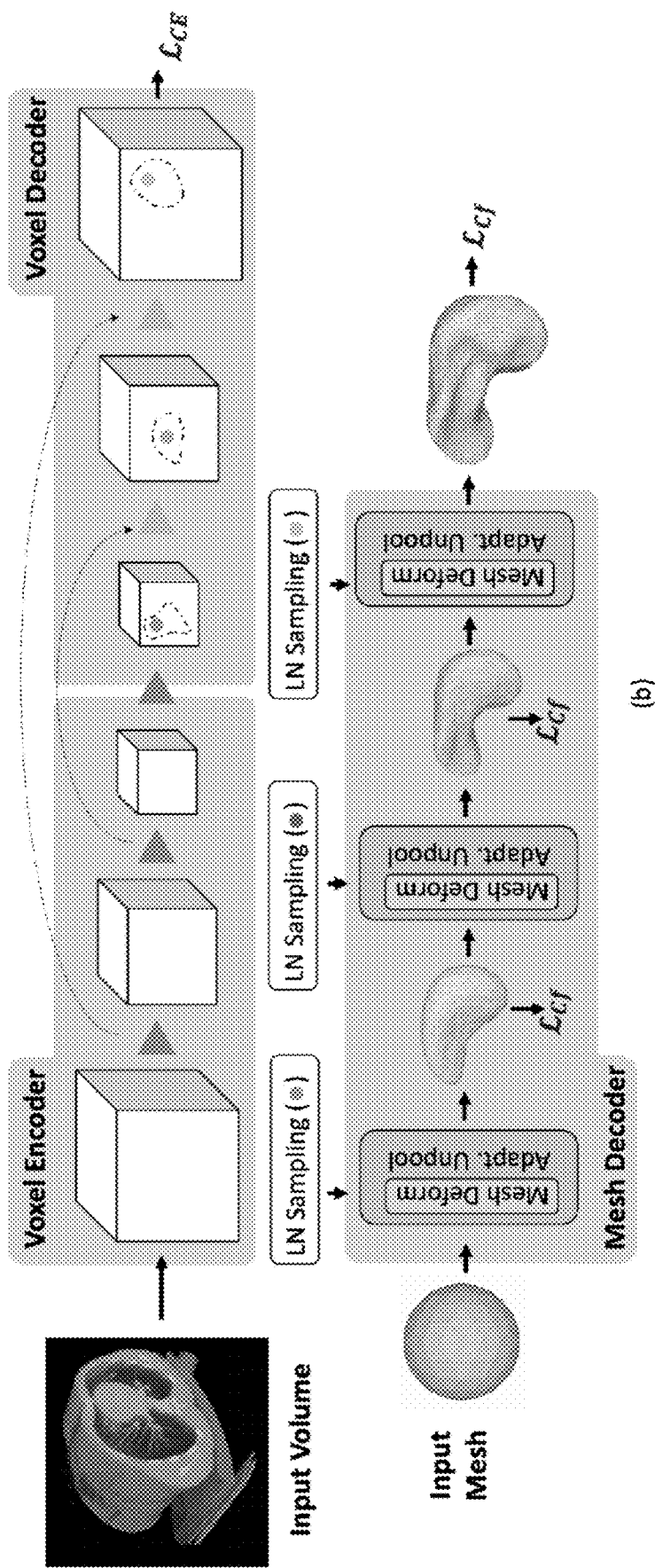

FIG. 2B depicts an exemplary flowchart representing the Mesh R-CNN architecture that uses a 2D image as input data and produce a surface mesh as output data, according to the state of the art. The "Voxel Branch" in the network takes the 2D image as input and produce an initial surface mesh. Then the "Mesh Refinement Branch" takes that initial surface mesh and further refine it to match the target object, in the exemplary variant shown a chair. The architecture uses multiple mesh refinement stages and each stage consist of a feature extraction layer, labelled as "Vert Align", graph convolution layers, labelled as "Graph Conv," and a mesh vertex update layer, labelled as "Refine." The element labelled "Box/Mask Branch" act as an auxiliary task that assist the element "Voxel Branch" in producing accurate initial meshes FIG. 2C depicts an exemplary flowchart representing the Voxel2Mesh architecture that uses 3D image volume or image stack as input data and produces a surface mesh as output data. The Voxel Branch consist of "Voxel Encoder" and "Voxel Decoder". "Voxel Decoder" produce features used by the "Mesh Decoder." "Mesh Decoder" use these features and deforms the input sphere to produce the output surface mesh. "Mesh Decoder" consist of multiple mesh refinement stages and each stage consist of a feature extraction layer labelled as "LN Sampling," Graph Convolutional layers labelled as "Mesh Deform," a mesh vertex update layer, also in "Mesh Deform," and a mesh sub-division/un-pooling layer "Adapti. Unpool."

Figure 2D:
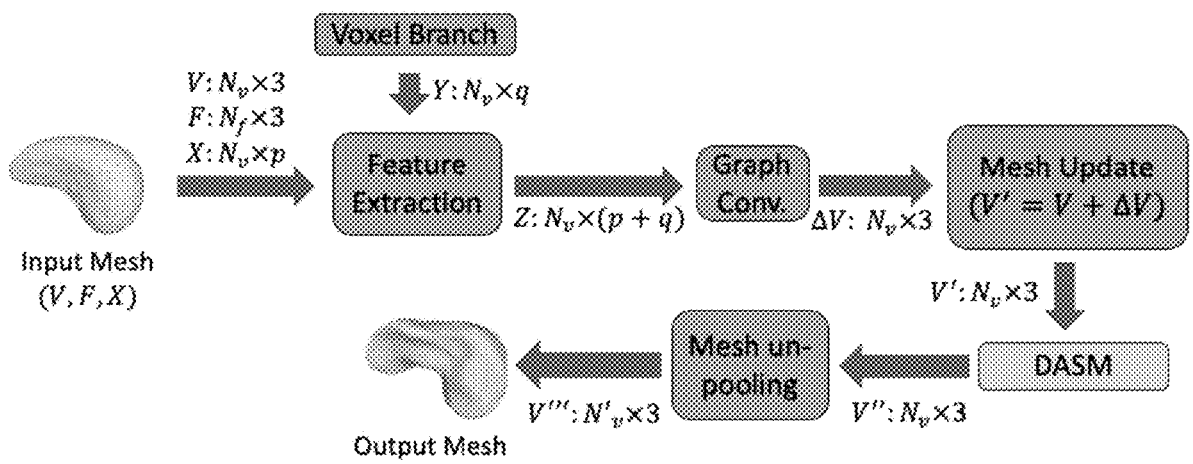

As shown in FIG. 2D, the deep active surface model (DASM) transformation step is provided as an additional, new layer into an existing GCNN mesh deformation step, for example in the methods and architectures provided in FIGS. 2B and 2C, and it can be positioned after any standard graph convolution layer, for example the "Mesh Deform" layers as shown in FIGS. 2B and 2C. A typical "Graph Conv" step, block, or element can consist of 2-10 Graph Convolution layers. The first layer take Z as input. Intermediate layers take and produce intermediate feature matrices with dimensions $N_v \times t$. The final layer output $\Delta V$. Typical and exemplary values for t range between 32 and 256. With respect to the variables used in FIG. 2D, V, F: vertex and face matrices defining the input surface mesh.
X: Feature matrix containing features associated with each vertex in V.
Y: Feature matrix extracted from voxel branch
Z: Feature vector obtained by concatenating X, Y
$\Delta V$: Vertex update values
V', V'', V''': Updated vertex matrices
$N_v$, $N_f$: Number of vertices and faces in the input mesh.
$N_v'$: Number of vertices in the mesh after Mesh un-pooling layer.
p, q: Number of features from input mesh and voxel branch. Typical values range between 16 and 256.

Figure 3:
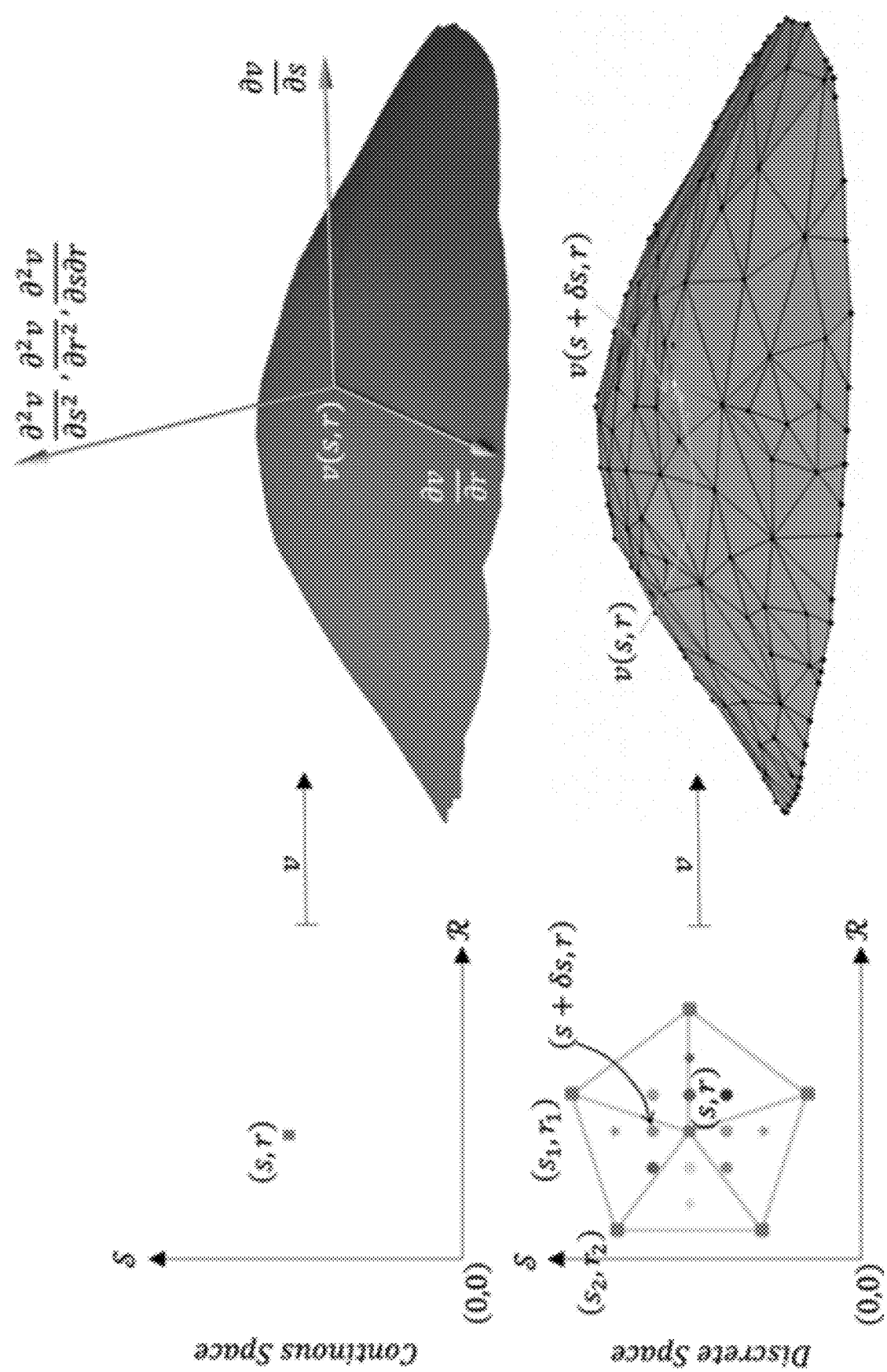
FIG. 3 shows a graphic representation of two surfaces, where the surface is represented by a differentiable mapping $v$ from $\mathbb{R}^2$ to $\mathbb{R}^3$. The bottom surface shows the surface after discretization, where $v(s,r)$ be a vertex. To approximate derivatives with respect to s using finite differences, estimate quantities such as $v(s+\delta s,r)$ are estimated where $\delta s$ is small. To this end, we estimate the barycentric coordinates $\lambda$, $\lambda_1$, and $\lambda_2$ of $v(s+\delta s,r)$ in the facet to which it belongs to and take $v(s+\delta s,r)$ to be $\lambda v(s,r)+\lambda_1 v(s_1,r_2)+\lambda_2 v(s_2+r_2)$ where $v(s_1,r_1)$ and $v(s_2,r_2)$ are the other two vertices of the facet. The same operation can be performed for derivatives with respect to r.

With respect to a definition of the Active Surface Model (ASM), the ASM can include a surface S(Φ) whose shape is controlled by a vector of parameters Φ and can be deformed to minimize an objective function E(Φ), often referred to as an energy. We first introduce a continuous formulation and then its discretization, which is the one used in practice. The continuous formulation can be given with S is represented by the mapping from $\mathbb{R}^2$ to $\mathbb{R}^3$.

$$v:(s,r;\Phi) \mapsto (v_x(s,r;\Phi), v_y(s,r;\Phi), v_z(s,r;\Phi)) \quad \text{Equation 1}$$

where $(s,r) \in \Omega = [0,1] \times [0,1]$. FIG. 3 depicts this mapping and its derivatives. (is typically taken to be $$\Phi^* = \underset{\Phi}{\arg\min}\, E(\Phi) \quad \text{Equation 2}$$
$$E(\Phi) = E_{dat}(\Phi) + E_{def}(\Phi)$$

where $E_{dat}$ is a data term that measures how well the surface matches the images and $E_{def}$ is a deformation energy that is smallest when the surface is smooth. $E_{def}$ is often written as $$E_{def} = \int_\Phi w_{10} \left\| \frac{\partial v}{\partial s} \right\|^2 + w_{01} \left\| \frac{\partial v}{\partial r} \right\|^2 + \quad \text{Equation 3}$$

-continued $$2w_{11}\left\|\frac{\partial^2 v}{\partial s \partial r}\right\|^2 + w_{20}\left\|\frac{\partial^2 v}{\partial s^2}\right\|^2 + w_{02}\left\|\frac{\partial^2 v}{\partial r^2}\right\|^2 drds$$

The surface $\Phi^*$ that minimizes the energy $E(\Phi)$ satisfies the associated Euler-Lagrange equation shown below:

$$F(v) = -\frac{\partial}{\partial s}\left(w_{10}\frac{\partial v}{\partial s}\right) - \frac{\partial}{\partial r}\left(w_{01}\frac{\partial v}{\partial r}\right) + \quad \text{Equation 4}$$
$$2\frac{\partial^2}{\partial s \partial r}\left(w_{11}\frac{\partial^2 v}{\partial s \partial r}\right) + \frac{\partial}{\partial^2 s}\left(w_{20}\frac{\partial^2 v}{\partial s^2}\right) + \frac{\partial}{\partial r^2}\left(w_{02}\frac{\partial^2 v}{\partial r^2}\right)$$

where $F = -\nabla E_{dat}$

With respect to the discrete formulation, when $S(\Phi)$ is discretized and represented by a triangulated mesh $M(\Phi)$, $\Phi$ becomes the 3N-vector built by concatenating the 3D coordinates of its N vertices. Using the finite-difference approximation described in the appendix, Equation 4 can be written in matrix form as $$A\Phi^* = F(\Phi)^* \quad \text{Equation 5}$$

where F is the negative gradient of $E_{dat}$ with respect to $\Phi$. Because A is usually non-invertible, given an initial value $\Phi^0$, a solution to this equation can be found by iteratively solving $$\alpha(\Phi^t - \Phi^{t-1}) + A\Phi^t = F(\Phi^t - 1), \quad \text{Equation 6}$$
$$\Rightarrow (A + \alpha I)\Phi^t = \alpha\Phi^{t-1} + F(\Phi^t - 1)$$

where I is the identity matrix. When the process stabilizes, $\Phi^t = \Phi^{t-1}$ and is a solution of Equation 5.

The strength of this semi-implicit optimization scheme is that it propagates smoothness constraints much faster than traditional gradient descent that minimizes energy $E(\Phi)$ and at a low computational cost because A is sparse, which means that the linear system of Equation 6 can be solved efficiently. In this scheme $\alpha$ plays the role of the inverse of a step size: When $\alpha$ is large enough for the Froebinius norm of $\alpha I$ to be much larger than that of A, the optimizer performs a steepest gradient step given by $F(\Phi^{t-1})$ with learning rate $1/\alpha$ at each iteration. Conversely, when $\alpha$ is small, A dominates and much larger steps can be taken.

In the original deformable contour models discussed in reference [19], the matrix $A + \alpha I$ was never inverted. Instead Equation 6 was solved by LU decomposition. Instead, to implement this effectively on a GPU using sparse tensors and to speed up the computations of the losses and their derivatives, we approximate the inverse of $(A + \alpha I)$ using the Neumann series $$(A + \alpha I)^{-1} \approx \sum_{n=0}^{K}(-1)^n \left(\frac{1}{\alpha}\right)^{n+1} A^n \quad \text{Equation 7}$$

and use it to solve Equation 6. We use K=4, which yields a sufficiently good approximation of actually solving Equation 6.

With respect to the computation of the regularization matrix A, In most traditional ASMs, the meshes are either square or hexagonal and regular, which makes the computation of the derivatives of the mesh vertices possible using finite-differences and, hence, the regularization matrix A of Equation 5 easy to populate. When the mesh is triangular and irregular, vertices can have any number of neighbors and the computation becomes more complex. Nevertheless, the required derivatives, of order 2 and 4, can still be expressed as finite differences of weighted sums of vertex coordinates where the weights are barycentric coordinates of small perturbations of the original vertices. This is explained in more detail below.

With respect to the Deep Active Surface Model (DASM), the update equation in a typical mesh-deforming graph-convolutional neural network (GCNN) that plays the same role as that of Equation 6 is:

$$\Phi^t = \Phi^{t-1} + \frac{1}{\alpha}F(\Phi^{t-1}, X^{t-1}) \quad \text{Equation 8}$$

where F denotes the negative gradient of the loss function calculated using the feature vector $X^{t-1}$ associated with the mesh parameters $\Phi^{t-1}$. In the case of our deep active surface models, it becomes $$(A + \alpha I)\Phi^t = \alpha\Phi^{t-1} + F(\Phi^{t-1}, X^{t-1}) \quad \text{Equation 9}$$

as in Equation 6. In Equation 8, the loss function typically includes a regularization term to keep the mesh smooth, whereas in Equation 9 our semi-implicit scheme enforces smoothness by solving the linear equation.

With respect to Uniform versus Adaptive DASMs, Equation 9 forms the basis of the simplest version of our DASMs, which we will refer to as uniform DASMs because the same amount of smoothing is applied across the whole mesh. This may result in under- or over-smoothing because some parts of the objects require more smoothing while some parts do not. To account for this, we also introduce adaptive DASMs that are designed to smooth only where necessary, as indicated by an auxiliary metric. Experimentally, adaptive smoothing is required when the GCNN produces particularly large deformations but only in a very specific part of the mesh or fails to smooth-out artifacts produced by mesh initialization algorithms. This could be eliminated by strongly smoothing everywhere but would degrade accuracy in high-curvature areas.

To solve this problem, we begin by using the approximation of $(A + \alpha I)^{-1}$ from Equation 7 to rewrite the evolution equation of Equation 9 as $$\Gamma^t = \Phi^{t-1} + \frac{1}{\alpha}F(\Phi^{t-1}, X^{t-1}), \quad \text{Equation 10}$$
$$\Phi^t = \left(I + \sum_{n=1}^{K}(-1)^n\left(\frac{1}{\alpha}\right)^n A^n\right)\Gamma^t$$
$$= \Gamma^t + B\Gamma^t \text{ with } B = \sum_{n=1}^{K}(-1)^n\left(\frac{1}{\alpha}\right)^n A^n$$

$\Gamma^t$ represents $\Phi^{t-1}$ incremented by the negative gradient of the loss function $F(\Phi^{t-1})$ but not yet smoothed. In other words, we have rewritten the smoothing operation that transforms $\Gamma^t$ into $\Phi^t$ as simply adding $B\Gamma^t$ to $\Gamma^t$. This gives us the freedom to decide where we want to smooth and where we do not by introducing a diagonal matrix $\Lambda$ and rewriting the update rule of Equation 10 as $$\Phi^t = \Gamma^t + \Lambda B\Gamma^t \quad \text{Equation 11}$$

Figure 4:
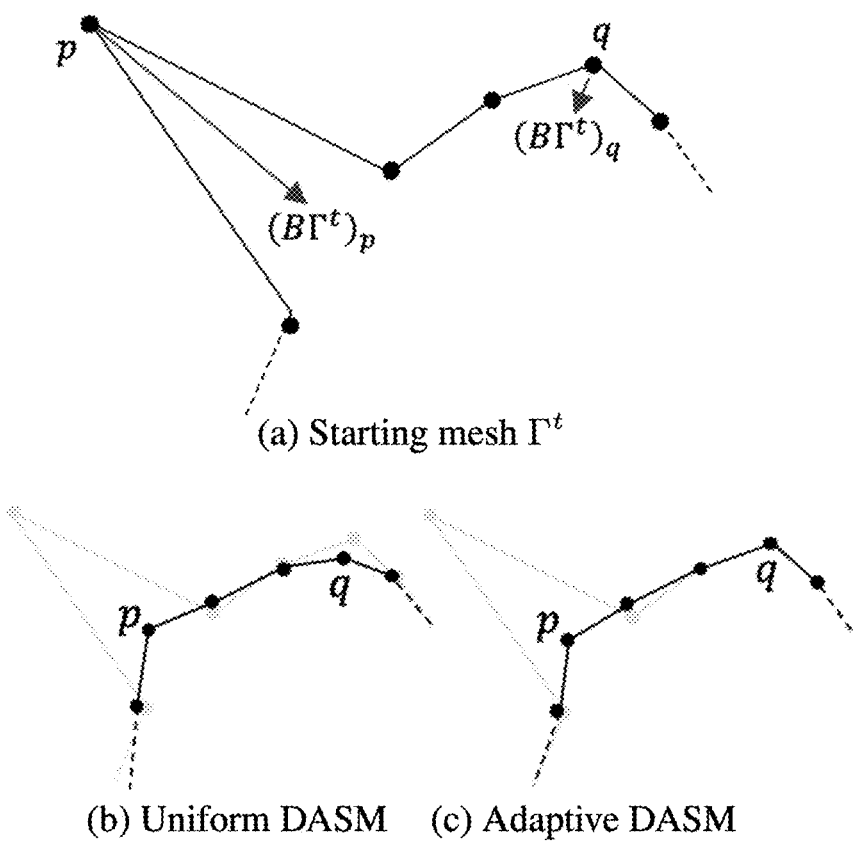
FIG. 4 show three simplified graphs (a), (b) and (c) representing a surface mesh in two dimensional form for visualization purposes, to compare the results of uniform versus adaptive smoothing, with graph (a) the mesh at time t. In general, $|B\Gamma^t|_q < |B\Gamma^t|_p$. With (b), when using enough uniform smoothing to remove the irregularity at point p, the mesh will typically be oversmoothed at q. As seen with graph (c), when using adaptative smoothing, the mesh is smoothed around p but not oversmoothed around q.

This update rule is similar to the one of the Adagrad algorithm described in reference [11]. Here, each diagonal component $\lambda_{i,i}$ of $\Lambda$ rescales the corresponding component $(B\Gamma)_i$ of $B\Gamma$. In Adagrad, adaptive re-scaling is a function of past gradients. Here we take it to be a function of current surface gradients because we have observed that $|B\Gamma^t|_i$ tends to grow large when the facets increase in size and smoothing is required, and remains small otherwise. We therefore take the diagonal values of $\Lambda$ to be $$\lambda_{ii} = \sigma(|B\Gamma^t|_i; \beta, \gamma) \qquad \text{Equation 12}$$

where $\sigma$ is the Sigmoid function and $\beta,\gamma$ are its steepness and midpoint. In this way, for small values of $|B\Gamma^t|_i$, there is almost no smoothing, but for larger ones there is. FIG. 4 illustrates this behavior. With this adaptive smoothing step that can be part of the method, to only smooth significantly rough regions. The metric defined by Equation 12 is used to quantify the smoothness of the surface at difference vertices and is used to identify the regions that require smoothing. By doing so, we can preserve minor details, for example ones that are not significantly rough in the mesh and only smooth out significantly rough regions.

Figures 5, 6A:

With respect to recursive smoothing, any single DASM step given by Equation 11 can only rectify a finite amount of deformations. To mitigate this, we perform more than one adaptive-smoothing step in-between gradient updates. During these additional smoothing steps no gradient update is done and we use $F(\Phi^{t-1}, X^{t-1})=0$. In practice, we can perform these steps until $|\Phi^t - \Phi^{t-1}| < \varepsilon$, where $\varepsilon$ is a preset constant. FIG. 5 illustrates the results of this process.

With respect to the loss terms, in architectures such as Mesh R-CNN as discussed in reference [14] and Voxel2Mesh as discussed in reference [42], a loss term is used to supervise the output of each mesh-refinement stage. We follow the same approach and add a loss term at the end of each DASM module. We write it as $$L = L_{data} + \lambda L_{reg.}, \qquad \text{Equation 13}$$

$$L_{data} = \lambda_{cf.} L_{cf.} + \lambda_{n.dist} L_{n.dist},$$

$$L_{reg.} = \lambda_{edge} L_{edge} + \lambda_{Lap.} L_{Lap.} + \lambda_{n.cons.} L_{n.cons.}$$

Here $L_{Cf.}, L_{n.dist.}$ are Chamfer and Normal distances [14] of the Voxel2Mesh and $L_{edge}, L_{Lap.}, L_{n.cons.}$ are edge length loss, Laplacian loss and normal consistency loss, respectively, with respect Pixel2Mesh as discussed in reference [40]. All these loss terms are used in Voxel2Mesh except $L_{Norm.}$; Similarly, they are all used in Mesh R-CNN except $L_{Lap.}$ and $L_{Norm.}$.

With respect to the continuous formulation of the active surface model, our objective is to minimize the total energy E in Equation 2. There is no analytical solution for the global minimum of E. But, as mentioned above, any local minimum must satisfy the associated Euler-Lagrange equation given in Equation 4. To find a surface that does this, surface evolution is used by introducing a time t parameter into four 4 and writing $$\partial v(s,r,t;\Phi)/\partial t + L(v(s,r,t;\Phi)) = F(v,s,r,t;\Phi) \qquad \text{Equation 14}$$

where $L(v(s,r,t;\Phi))$ is the right hand side of Equation 4. Solving Equation 14, requires specifying an initial surface. Earlier approaches discussed in references [9, 19] used a manual initialization, whereas in in references [27, 5] another model is used to predict the initial curve. To ensure the reached local minima corresponds to the desired curve, these approaches require the initialization to be close to the target shape. In DASM, we rely instead on the graph-convolution layers to provide a good initialization.

With respect to the discrete formulation of the active surface model, in the continuous formulation, computing the solution to Equation 4 requires computing the derivatives of order 2 and 4 for the mapping v of Equation 1. To compute them in practice, we discretize the surface and use finite difference equations to estimate the derivatives. Given a small value of $\delta s$, finite-difference approximations for the derivatives w.r.t s can be written as follows:

$$\frac{\partial v}{\partial s} \approx \frac{1}{\delta s}[v(s+\delta s, r) - v(s, r)],$$

$$\frac{\partial^2 v}{\partial s^2} \approx \frac{1}{\delta s^2}[v(s+\delta s, r) - 2v(s, r) + v(s-\delta s, r)],$$

$$\frac{\partial^3 v}{\partial s^3} \approx \frac{1}{\delta s^3}[v(s+2\delta s, r) - 3v(s+\delta s, r) + 3v(s, r) - v(s-\delta s, r)],$$

$$\frac{\partial^4 v}{\partial s^4} \approx \frac{1}{\delta s^4}[v(s+2\delta s, r) - 4v(s+\delta s, r) + 6v(s, r) - 4v(s-\delta s, r) + v(s-\delta s, r)]$$

Similarly, we can write finite difference equations w.r.t r as well.

Figure 11:
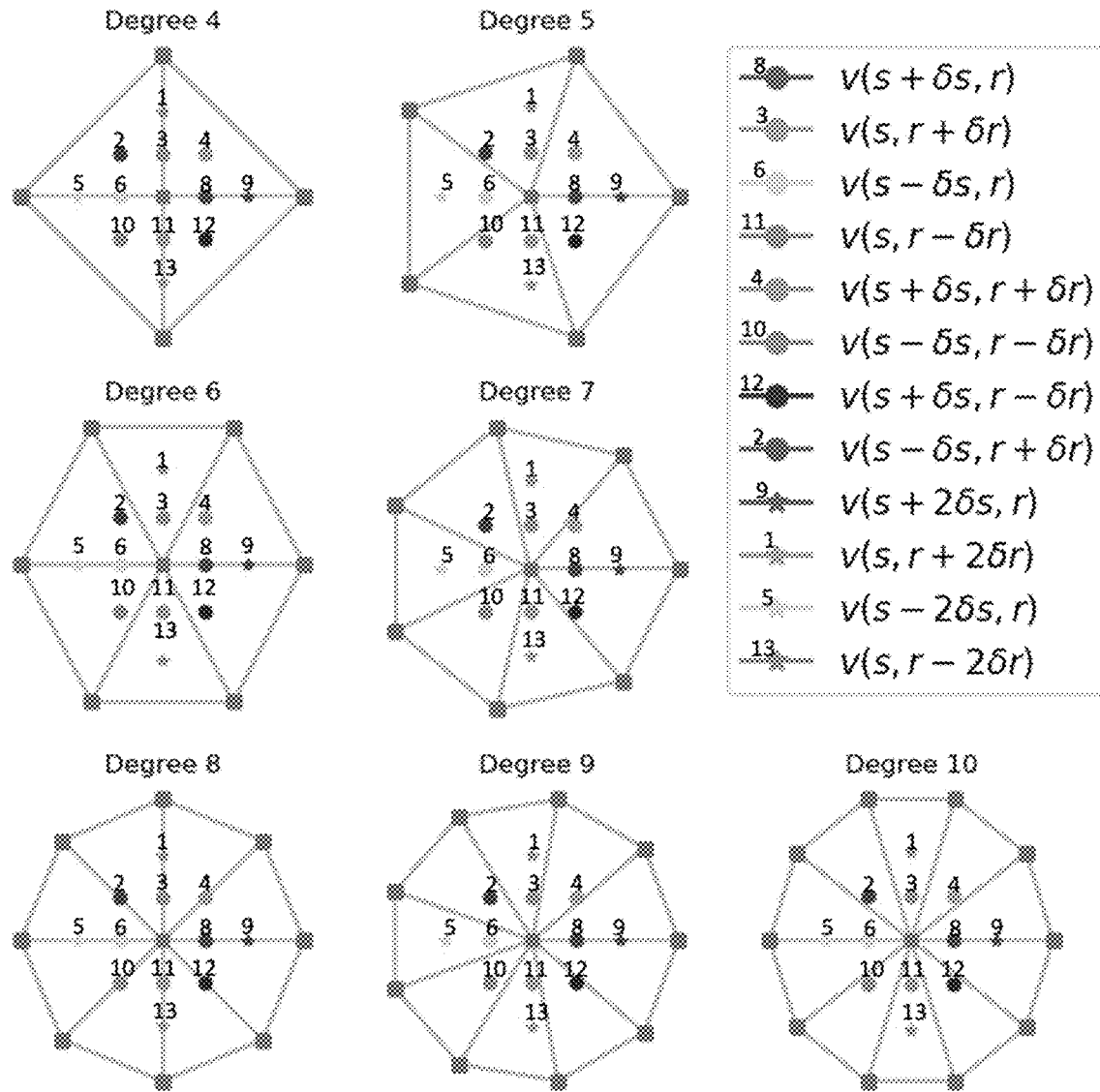
FIG. 11 different graphs in a two-dimensional view representing the finite differences. Relative positions of terms w.r.t (s,r) which is at the center and its 1-ring neighbors from exemplary degrees 4 to 10.

Now to compute these approximations, we need to compute $v(s+\delta s)$ and other similar terms. Let us therefore take $(s,r)$ be the 2D coordinates that $v$ maps to the coordinates of a specific vertex. In an irregular grid, $(s, r+\delta r)$, $(s+\delta s, r)$, or any of $s,r$ coordinates that appear in the derivative computations will in general not be mapped to another vertex for any choice of $\delta s, \delta r$. FIG. 11 illustrates their actual positions depending on the number of neighbors the vertex has. We can nevertheless compute the 3D coordinates they map to as follows. Let us first consider the 3D point $v(s+\delta s, r)$ that $(s+\delta s, r)$ gets mapped to and it is depicted by orange circle in FIG. 3. For $\delta s$ small enough, it belongs to a facet of which $v(s,r)$ is a vertex and let $v(s_1, r_1)$ and $v(s_2, r_2)$ be the other two. We can compute the barycentric coordinates $\lambda, \lambda_1,$ and $\lambda_2$ of $v(s+\delta s, r)$ in that facet by solving $$\begin{bmatrix} s+\delta s \\ r \\ 1 \end{bmatrix} = \begin{bmatrix} s & s_1 & s_2 \\ r & r_1 & r_2 \\ 1 & 1 & 1 \end{bmatrix} \begin{bmatrix} \lambda \\ \lambda_1 \\ \lambda_2 \end{bmatrix} \qquad \text{Equation 15}$$

Given these barycentric coordinates, we can now estimate $v(s+\delta s, r)$ as $$\lambda v(s,r) + \lambda_1 v(s_1, r_1) + \lambda_2 v(s_2, r_2) \qquad \text{Equation 16}$$

which allows us to estimate $\partial v/\partial s$ according to the above finite-difference equations. For this approximation to be valid, we pick $\delta s$ such that all terms in finite-difference expressions lie within the 1-ring neighborhood of $v(s,r)$. We can repeat the process for all the other expressions involving $\delta s$ in these equations and, hence, compute all required derivatives. Regular square and hexagonal grids are special cases in which these computations can be simplified.

Figure 12:
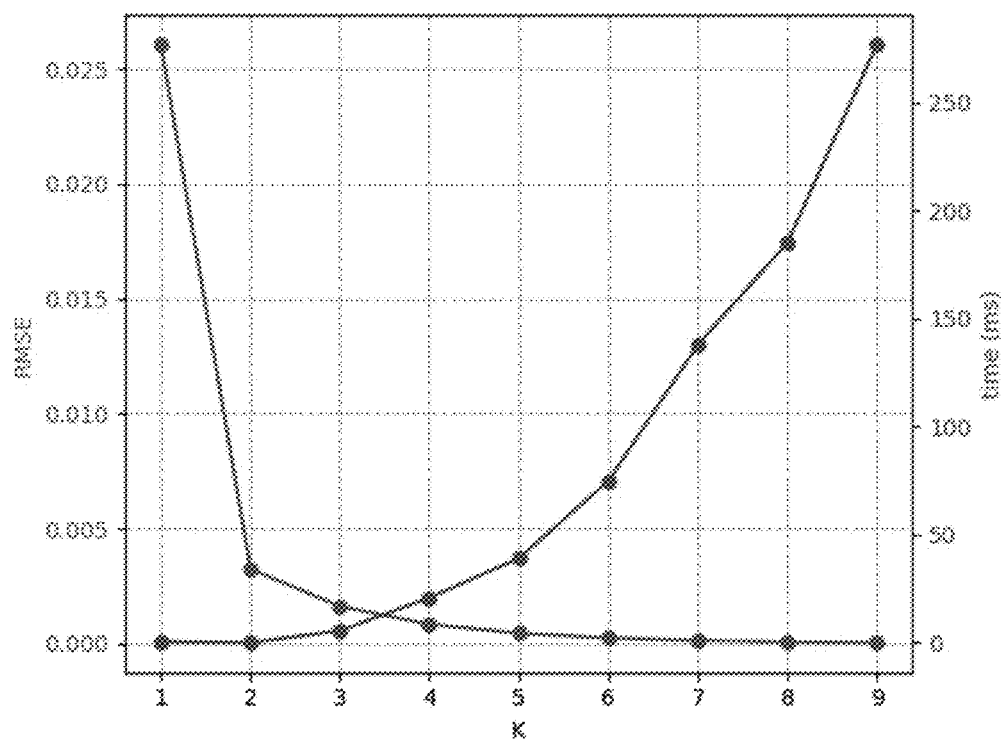
FIG. 12 shows the results in a graph of the Neumann series approximation, where RMSE between the approximated inverse and the true one in the descending graph and computation time in the ascending graph as function of K. K=4 gives an acceptable trade-off between the two.

Concerning the matrix inversion using the Neumann series, we are approximating the inverse of $(A+\alpha I)^{-1}$ using the Neumann series given in Equation 7. In FIG. 12, we plot both RMSE in estimating the inverse and the time it takes to perform the estimation as a function of K. Given the trade off between running time and accuracy, we pick K=4 for the estimation.

Also, the mesh regularization can be quantitatively measured with consistency metrics. All the metrics used above evaluate the accuracy of the meshes. We use them because they are the standard metrics used in the literature. But to get a better understanding of the quality of the meshes, we provide two more metrics; mean edge length and mean surface Laplacian. We observe that around abnormalities such as those highlighted by orange arrows in FIGS. 7 and 9, the edge lengths and surface Laplacians tend to increase significantly. This increases mean edge length and mean surface Laplacian and its effect can be seen in Table 7 of FIG. 13.

Next, different experiments have been performed and the results are discussed. Specifically, in this section, we test DASM's ability to predict 3D surfaces from 2D images from the Shapenet exemplary dataset and to extract 3D surfaces from electron microscopy image stacks.

With respect to generation of 3D surfaces from a 2D image, for prediction of 3D surfaces from 2D images, we benchmark our Adaptative DASM, which we will refer to as Ad.-DASM, on the ShapeNet dataset as discussed in reference [3]. Concerning the baselines, a Mesh R-CNN is used both as a baseline and as the backbone of our network because, among methods that use explicit surface representations, it is currently reported as yielding the best results on ShapeNet. We also compare against Pixel2Mesh as discussed in reference [40].

With respect to the exemplary dataset, ShapeNet is a collection of 3D textured CAD models split into semantic categories. As in the Mesh R-CNN experiments, we use ShapeNetCore.v1 and corresponding rendered images from the reference [7]. They are of size 137×137 and have been captured from 24 random viewpoints. We use the train/test splits of reference [14], that is, 35,011 models seen in 840,189 images for training and 8,757 models seen in 210,051 images for testing. We use 5% of the training data for validation purposes. Regarding the metrics, we use the same metrics as in Mesh R-CNN. They are the Chamfer distance, Normal distance, and $F1^\tau$ at $\tau$=0.1, 0.3 and 0.5. For the Chamfer distance a lower value is better while a higher value is better for the others. With respect to the implementation, we use the publicly available Pytorch implementation of Mesh R-CNN and incorporate Adaptative DASM layers after each mesh-refinement stage. We also add a Uniform DASM layer after the cubify operation to make the input to mesh refinement stages smooth. We train the networks for 12 epochs using Adam optimizer as discussed in reference with a learning rate $10^{-4}$. We set $\alpha$=1, $\beta$=6000 and $\gamma$=15.

Mesh R-CNN only uses the $L_{edge}$ term of Equation 13 for regularization purposes when training on ShapeNet and turns off the term $L_{Lap.}$ because, according to remarks on Github by the authors, it has not helped to improve the results. For a fair comparison, we therefore do the same. In this setup, $L_{edge}$, which penalizes increases in edge-length, is the only other source of geometric regularization besides the one we provide with our DASM layers. We will therefore experiment with different values of $\lambda_{edge}$, the weight parameter in Equation 13 that controls how much influence it is given.

Figure 7:
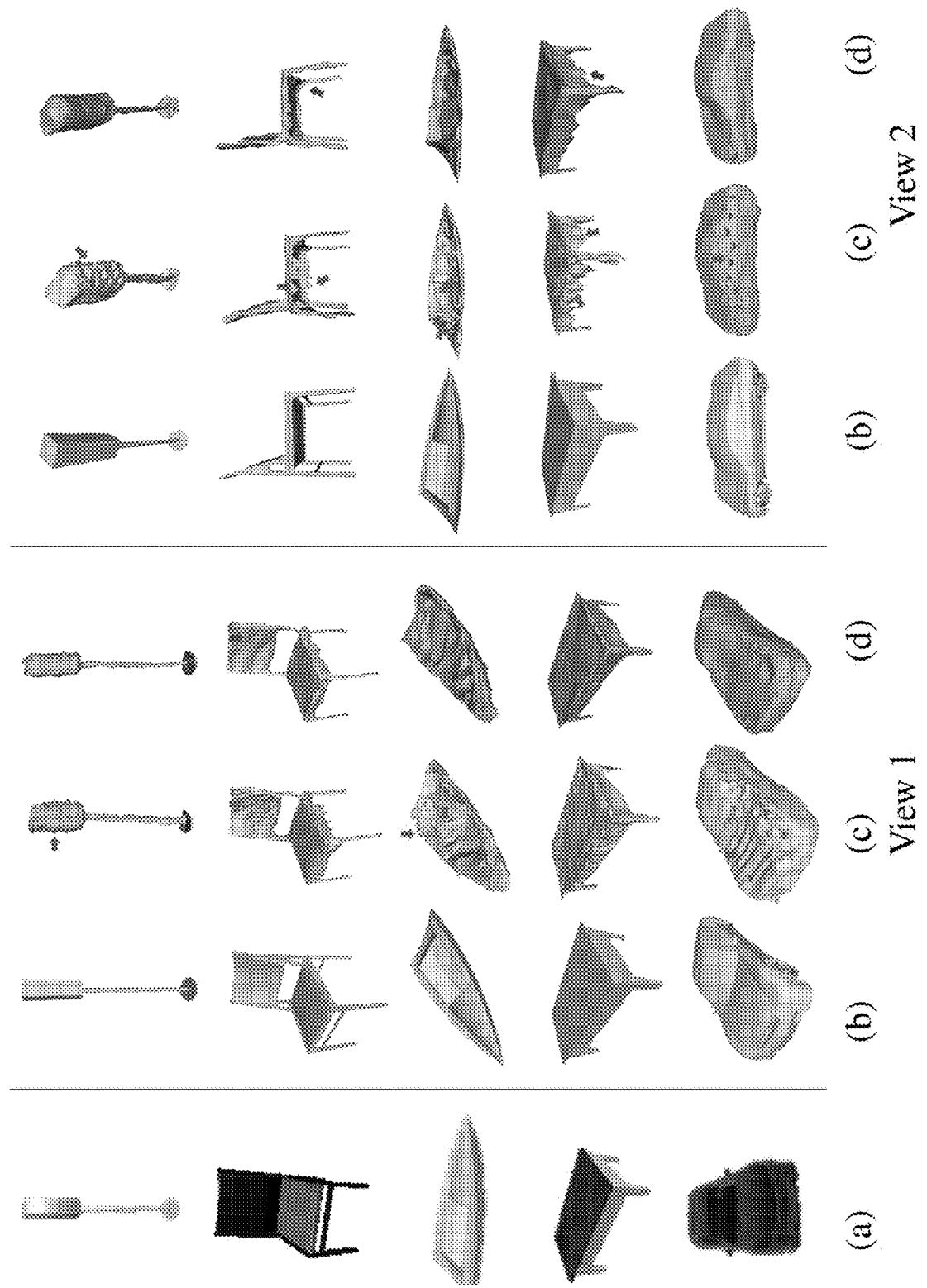
FIG. 7 depict different objects and corresponding meshes of the ShapeNet Results, with the graphs (a) showing different input images, meshes (b) showing the ideal meshes from two different viewpoints in the middle and in the right section, meshes (c) showing Mesh R-CNN results from two different viewpoints in the middle and in the right section, with the arrows highlighting commonly seen Mesh R-CNN artifacts, meshes (d) showing DASM results in the same two views. The meshes are much smoother and most artifacts have disappeared, except for a few highlighted by blue arrows.
Figure 8:
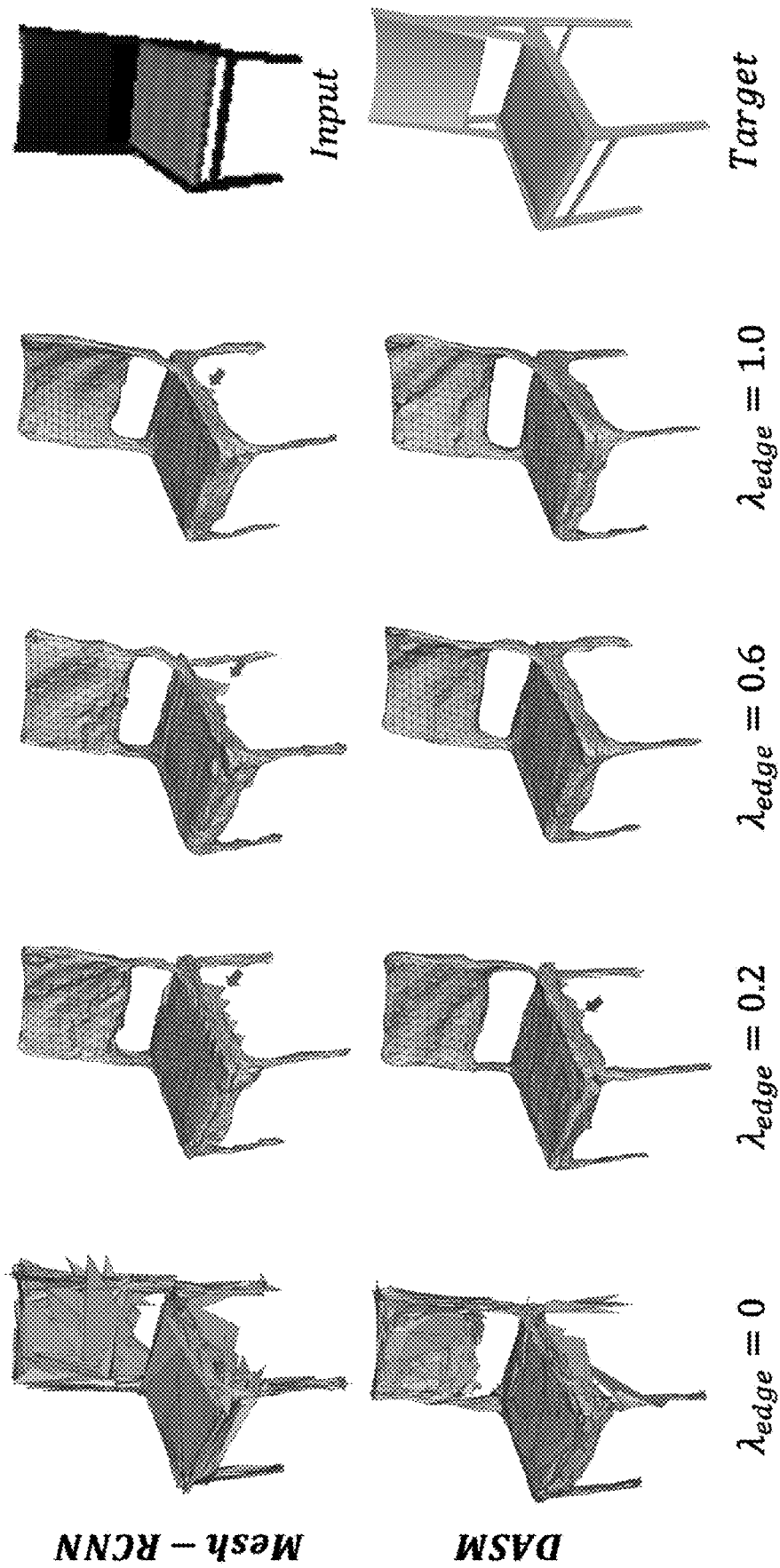
FIG. 8 shows an object and different meshes to visualize the influence of the regularization term. As $\lambda_{reg}$ increases, the output of both methods becomes smoother but only DASM completely eliminates the artifacts. Note that in the case $\lambda_{reg}=0$, the output of Mesh R-CNN is an extremely irregular mesh that nevertheless scores well on the Chamfer metric.

Turning now to the results, we provide qualitative results in FIG. 7 and report quantitative results in Table 1 as shown in FIG. 6A for $\lambda_{edge}$=0.2. Ad.-DASM outperforms Pixel2Mesh and boosts the performance of Mesh R-CNN. Furthermore, the meshes it produces are of much a better visual quality. In Table 2 shown in FIG. 6B, we report similar results for different values of $\lambda_{edge}$, which are depicted qualitatively by FIG. 8. The trend is the same for $\lambda_{edge}$=0.6 and 1.0. However, for $\lambda_{edge}$=0.0, the Chamfer distance for Mesh R-CNN is lowest even though the resulting meshes are extremely noisy, as can be seen in the leftmost column of FIG. 8.

This somewhat surprising result may be a result of the fact that Mesh R-CNN are so noisy that DASM smoothing takes them away from the data they are trying to fit and degrades the Chamfer distance. In any event, even though the Chamfer distance is low, this can hardly be considered as a good results, hence confirming the observation made in references [14, 40] that this metric might not be the best to evaluate the quality of a mesh. When $\lambda_{edge}$=1.0, the difference between DASM and Mesh R-CNN performance is not statistically significant and this is because, when using higher $\lambda_{edge}$, there are not many anomalies for the DASM to fix.

With respect to any postprocessing or ablation, it could be argued that we would have gotten similar results by simply smoothing our meshes as a post-processing step. To demonstrate this is not the case, we implemented PostProc-ASM that starts with Mesh R-CNN model trained with $\lambda_{edge}$=0.2 that is then adaptively smoothed by running several times the surface evolution update of Equation 11. In Table 3 of FIG. 6C, we compare PostProc-ASM against Ad.-DASM and the results are clearly worse. We also compare Ad.-DASM against Uniform-DASM, which clearly shows the benefit of the adaptive scheme discussed above. Regarding failure modes, the main source of failures are anomalies produced by the GCNN that are too large to be rectified. Remaining ones are denoted by blue arrows in FIG. 8.

Turning now to the application where 3D image stacks, for example medical imaging stacks from a medical imaging device such as a CT or MRI scanner, to 3D surfaces, we benchmark our approach on CortexEM dataset and compare DASM against Voxel2Mesh of reference [42] and several other baselines. We use Voxel2Mesh both as a baseline and as the backbone of our network. We also compare our performance against several architectures popular in the biomedical imaging community, for example the ones discussed in the references [8, 30, 17, 37, 2].

Figure 9:
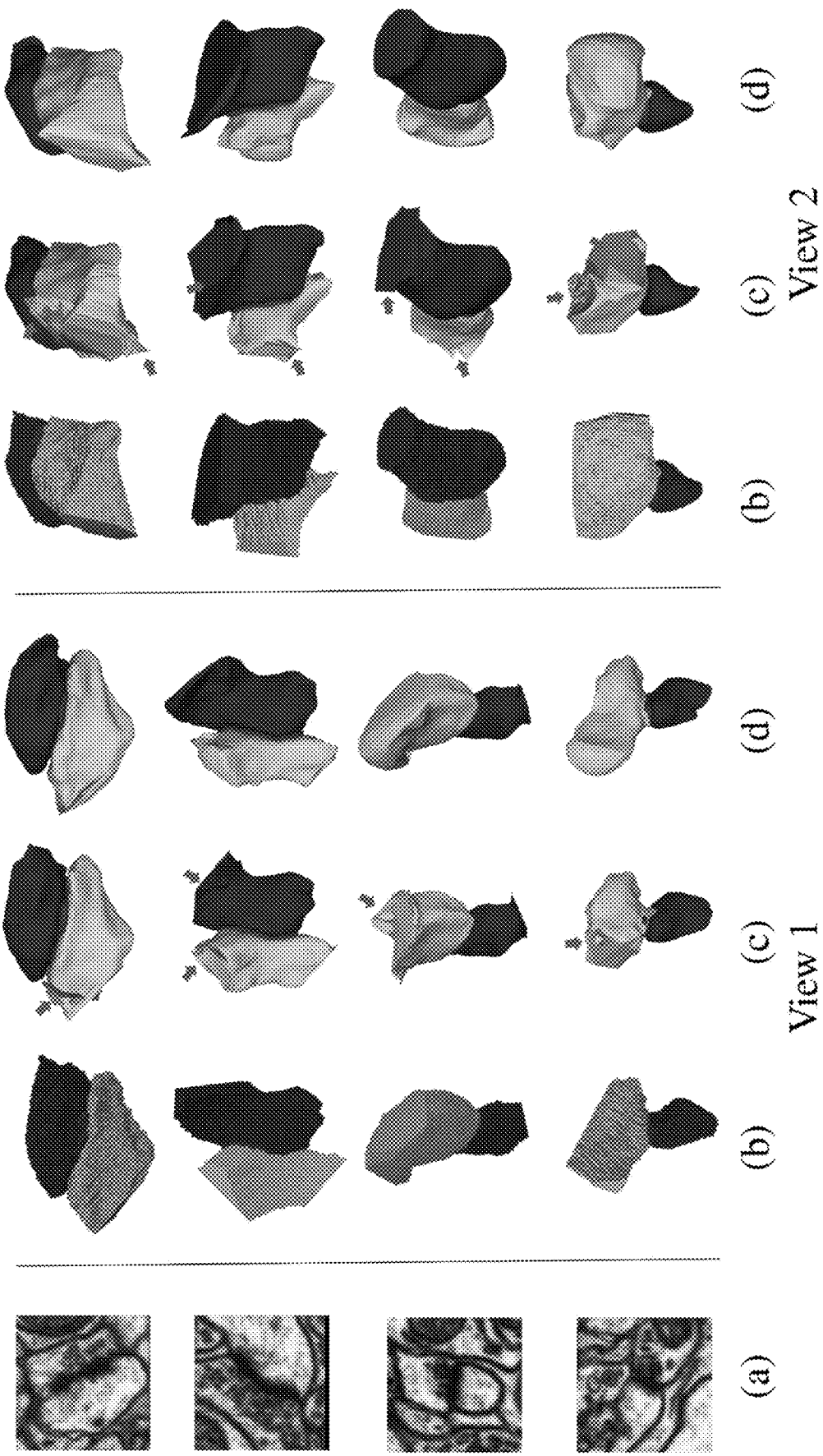
FIG. 9 shows images of brain synapses and the modelling thereof based on electron microscopy image stacks, with images (a) being four (4) representative slices from the input volume, meshes (b) are the ground truth representation of the volume, meshes (c) Voxel2Mesh results seen from two different views, meshes (d) DASM results seen from the same two different views. The pre-synaptic region is shown in the darker color, post-synaptic region in the brighter color, and synaptic cleft shown therebetween, with (b), (c), and (d) showing two different angles of view. The DASM results are much smoother and without artifacts, while also being more accurate.

As an exemplary dataset, CortexEM is a 500°ø500°ø200 FIB-SEM image stack of a mouse cortex. From this 26 sub-volumes with dimension 96°ø96°ø96 were extracted so that each one contains a synaptic junction that is roughly centered. 14 sub-volumes in the first 100 slices in the image stack are used for training and the remaining 12 in the next 100 slice are used for testing. The task is to segment the pre-synaptic region, post-synaptic region, and synaptic cleft as shown in FIG. 9. For the metrics, as in reference [42] and many other papers, we use the intersection-over-union (IoU) as a measure of quality for volumetric segmentation. To compare the meshes, we use the Chamfer distance as in reference [42]. We repeat our experiments three times for each model and report the mean and the standard deviation.

Regarding the implementation, as we did with Mesh R-CNN discussed above with respect to the 3D surface generation form 2D images, we incorporate Ad.-DASM layers into a Voxel2Mesh backbone. We train the networks for 150,000 iterations using Adam optimizer discussed in reference [20] with a learning rate of 10-4. We set $\alpha$=1, $\beta$=6000 and $\gamma$=45. To match the conditions in reference [42], Ad.-DASM was trained using $\lambda_{edge}$=$\lambda_{Lap.}$=$\lambda_{n.cons.}$=0.25 in Equation 13. For comparison purposes, we also use $\lambda_{edge}$=$\times_{Lap.}$=$\lambda_{n.cons.}$=0.025. To differentiate two versions, we add the regularization coefficients as a subscript to model names. This gives us Voxel2Mesh$_{0.25}$, Ad.-DASM$_{0.25}$, Voxel2Mesh$_{0.025}$, and Ad.-DASM$_{0.025}$.

Turning now to the obtained results, we can report quantitative results in Table 4 of FIG. 10A in IoU terms and in Table 5 of FIG. 10B in Chamfer distance terms. FIG. 9 depicts qualitative results for Ad.-DASM, and Voxel2Mesh. Ad.-DASM easily outperforms Voxel2Mesh when segmenting pre and post synaptic regions. For the smaller synaptic junction, Voxel2Mesh and DASM are statistically equivalent because, unlike for the other two regions, their shapes are simple and there is not much improvement for DASM to make. In fact, the best result is obtained by a vanilla U-Net. Concerning the computational time, an average execution time for a single forward and backward pass for Voxel2Mesh and DASM is shown in Table 6 of FIG. 10C. We run this test on a single Tesla V100 GPU. We have implemented the ASM module using custom CUDA kernels and uses sparse tensors. Assembling the regularization matrix and performing the update of Equation 11 adds a 40% overhead, which is reasonable giving how large the matrices we deal with are.

Figure 14:
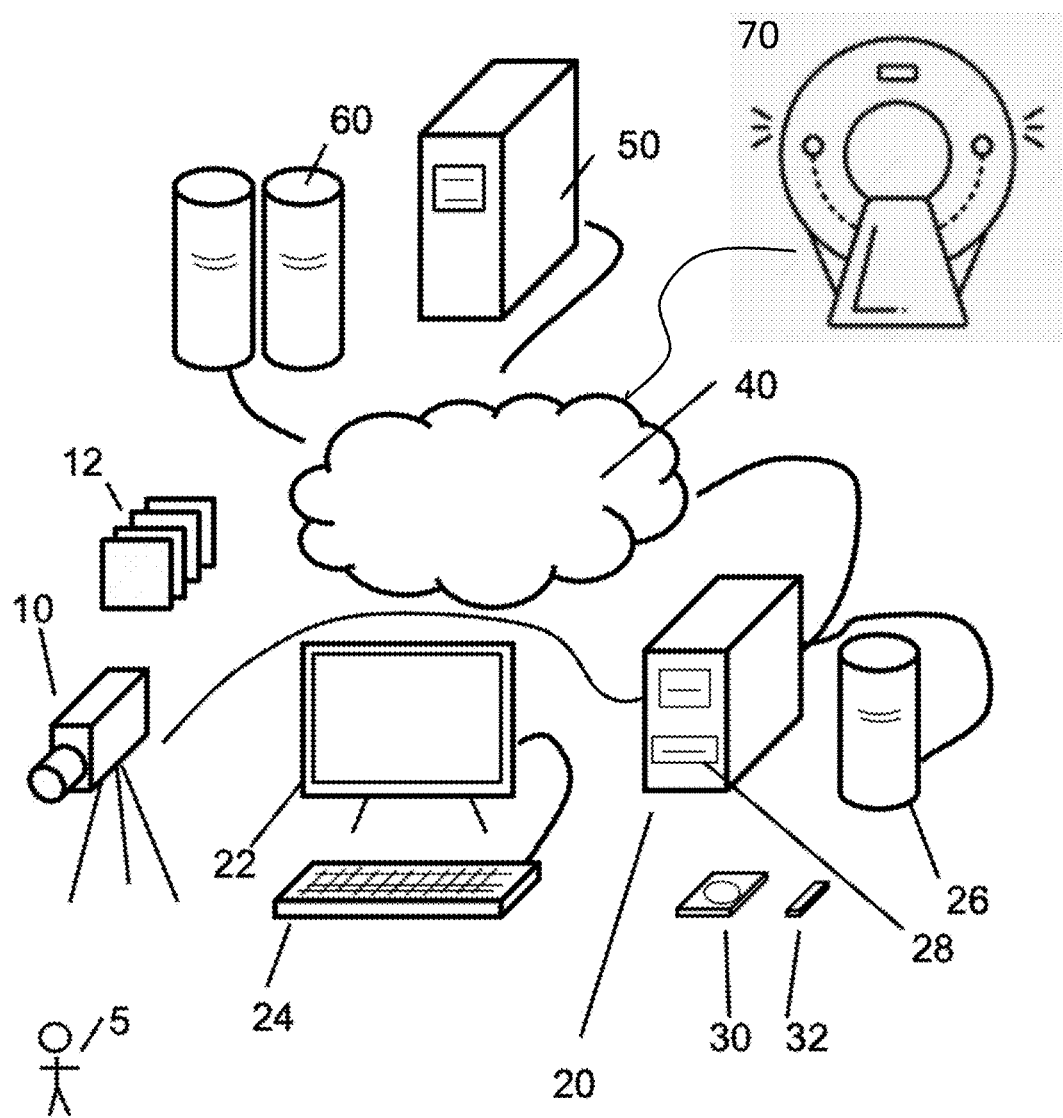
FIG. 14 shows a schematic perspective view of an exemplary device of system for implementing the method herein.

FIG. 14 shows an exemplary device and system for implementing the method described above, in an exemplary embodiment the method shown in FIG. 2A. The system can include a camera 10, for example a TOF camera or other camera configured to capture one or more three-dimensional images 12 of an object. Camera 10 can also connected to a processing device 20, for example but not limited to a personal computer (PC), Macintosh™ computer, laptop, notebook, netbook. In addition, a medical imaging device 70 can be part of system, for example directly or remotely connected to data processing device 20, for example an MRI or CT scan apparatus. In a variant, three-dimensional images 12 can be pre-stored on processing device 20, or can arrive to data processing device 20 from the network 40, for example from a server 50 or data repository. Processing device 20 can be equipped with one or several hardware microprocessors and with internal memory. Also, processing device 20 is connected to a data input device, for example a keyboard 24 to provide for user instructions for the method, and a data display device, for example a computer screen 22, to display different stages and final results of the data processing steps of the method. For example, different three-dimensional representations of the meshes can be displayed on computer screen 22, and also the originally obtained three-dimensional images 12. Processing device 20 is also connected to a network 40, for example the Internet, to access various cloud-based and network based services, for example but not limited to cloud or network servers 50, cloud or network data storage devices 60. The method described above can also be performed on hardware processors of one or more servers 50, and the results sent over the network 40 for rendering and display on computer screen 22 via processing device 20. Processing device 20 can be equipped with a data input/output port, for example a CDROM drive, Universal Serial Bus (USB), card readers, storage device readers, to read and write data, for example computer readable and executable instructions, from non-transitory computer-readable media 30, 32. Non-transitory computer-readable media 30, 32 are storage devices, for example but not limited to external hard drives, flash drives, memory cards, USB memory sticks, CDROM, Blu-Ray™ disks, optical storage devices and other types of portable memory devices that are capable of temporarily or permanently storing computer-readable instructions thereon. The computer-readable instructions can be configured to perform the method, as described above, when loaded to processing device 20 and executed on a processing device 20 or a cloud or other type of network server 50, for example the method shown in FIG. 2A.

Figure 1:
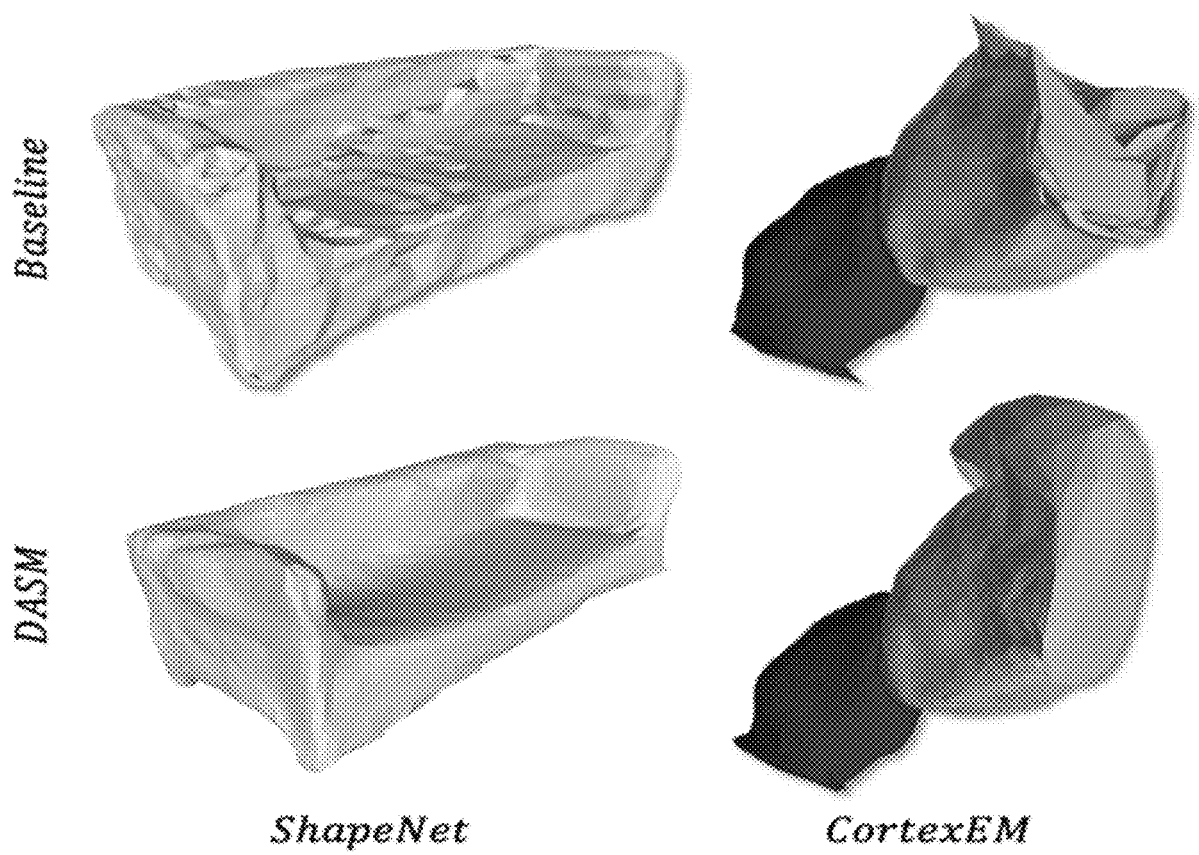
FIG. 1 shows different representations of 3D surfaces, on the left side showing a couch modelled from an RBG image, and on the right side a synaptic connection of a brain segmented from an electron microscopy stack, with the top two representations showing the 3D surfaces generated by a Mesh R-CNN and by Voxel2Mesh, two background art mesh generating methods, and on the bottom showing the results of the same objects using the same image backbones using the herein presented method with the deep active surface model (DASM) smoothing of filtering layers. It can be seen that the 3D surfaces and meshes of the lower two representations have far fewer artifacts and are also more accurate.

To briefly summarize, with the herein presented method, system, and device, it is possible to substantially solve the problem related to the artifacts generated by the GCNN, by introducing into the surface generating architecture a special-purpose layer that regularizes the meshes using a semi-implicit scheme that involves recursively solving sparse linear systems of linear equations. It propagates smoothness constraints much faster and more reliably than traditional gradient descent-based energy minimization without requiring much computational power and yields surface meshes that fit the data while remaining smooth, such as those shown at the bottom representations of FIG. 1.

Furthermore, with the herein presented method, system, and device, it is possible to modulate locally the amount of regularization we impose to the mesh, so that we regularize only where it is needed and therefore are able to preserve accuracy, and to use meshes consisting of vertices with arbitrary degrees which is not commonly seen in majority of Active Shape Models. Both of these are important to model complex 3D objects that can be smooth in some places and very curvy elsewhere. According to some aspects of the present invention, an original method, system and device is proposed based on the Active Surface Models (ASMs) to compute the derivatives required for back-propagation on such a mesh, to handle irregular 3D surface meshes, that is, meshes whose vertices can be of arbitrary degrees. Active Surface Models have a long history of being useful to model 3D surfaces. But only Active Contours have been used in conjunction with deep networks, and then only to produce the data term as well as meta-parameter maps controlling them. According to some aspects of the present invention, we advocate a much tighter integration of Active Surface Models, and we introduce layers that implement them that can be integrated seamlessly into Graph Convolutional Networks to enforce sophisticated smoothness priors at an acceptable computational cost. Herein, this approach is referred to as the Deep Active Surface Models (DASMs), and it has been shown they outperform equivalent architectures in which the smoothness constraints are imposed by minimizing a traditional loss function, for both 3D surface reconstruction from 2D images and for 3D volume segmentation.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

REFERENCES

D. Acuna, A. Kar, and S. Fidler. Devil is in the Edges: Learning Semantic Boundaries from Noisy Annotations. In Conference on Computer Vision and Pattern Recognition, 2019.

A. Kavur and M. Selver. CHAOS Challenge—Combined (CT-MR) Healthy Abdominal Organ Segmentation. 2020.

A. Chang, T. Funkhouser, L. G., P. Hanrahan, Q. Huang, Z. Li, S. Savarese, M. Savva, S. Song, H. Su, J. Xiao, L. Yi, and F. Yu. Shapenet: An Information-Rich 3D Model Repository. In arXiv Preprint, 2015.

Z. Chen and H. Zhang. Learning Implicit Fields for Generative Shape Modeling. In Conference on Computer Vision and Pattern Recognition, 2019.

D. Cheng, R. Liao, S. Fidler, and R. Urtasun. DARNet: Deep Active Ray Network for Building Segmentation. In Conference on Computer Vision and Pattern Recognition, 2019.

J. Chibane, T. Alldieck, and G. Pons-Moll. Implicit Functions in Feature Space for 3D Shape Reconstruction and Completion. In Conference on Computer Vision and Pattern Recognition, 2020.

C. Choy, D. Xu, J. Gwak, K. Chen, and S. Savarese. 3D-R2N2: A unified approach for single and multi-view 3d object reconstruction. In European Conference on Computer Vision, 2016.

Ö. Çiçek, A. Abdulkadir, S. Lienkamp, T. Brox, and O. Ronneberger. 3D U-Net: Learning Dense Volumetric Segmentation from Sparse Annotation. In Conference on Medical Image Computing and Computer Assisted Intervention, pages 424-432, 2016.

L. D. Cohen and I. Cohen. Finite-Element Methods for Active Contour Models and Balloons for 2D and 3D Images. IEEE Transactions on Pattern Analysis and Machine Intelligence, 15(11):1131-1147, November 1993.

S. Dong and H. Zhang. A Combined Fully Convolutional Networks and Deformable Model for Automatic Left Ventricle Segmentation Based on 3D Echocardiography. In BioMed Research International, 2018.

J. Duchi, E. Hazan, and Y. Singer. Adaptive Subgradient Methods for Online Learning and Stochastic Optimization. In Journal of Machine Learning Research, 2011.

P. Fua. Model-Based Optimization: Accurate and Consistent Site Modeling. In International Society for Photogrammetry and Remote Sensing, July 1996.

P. Fua and Y. G. Leclerc. Object-Centered Surface Reconstruction: Combining Multi-Image Stereo and Shading. International Journal of Computer Vision, 16:35-56, September 1995.

G. Gkioxari, J. Malik, and J. Johnson. Mesh R-CNN. In International Conference on Computer Vision, 2019.

A. Hatamizadeh, D. Sengupta, and D. Terzopoulos. End-To-End Trainable Deep Active Contour Models for Automated Image Segmentation: Delineating Buildings in Aerial Imagery. In arXiv Preprint, 2020.

L. He, Z. Peng, B. E., X. Wang, C. Y. Han, K. L. Weiss, and W. G. Wee. A Comparative Study of Deformable Contour Methods on Medical Image Segmentation. Image and Vision Computing, 26(2):141-163, 2008.

V. Iglovikov and A. Shvets. Ternausnet: U-Net with VGG11 Encoder Pre-Trained on Imagenet for Image Segmentation. In arXiv Preprint, 2018.

A. Jorstad, B. Nigro, C. Cali, M. Wawrzyniak, P. Fua, and G. W. Knott. Neuromorph: A Toolset for the Morphometric Analysis and Visualization of 3D Models Derived from Electron Microscopy Image Stacks. Neuroinformatics, 13(1):83-92, 2014.

M. Kass, A. Witkin, and D. Terzopoulos. Snakes: Active Contour Models. International Journal of Computer Vision, 1(4):321-331, 1988.

D. P. Kingma and J. Ba. Adam: A Method for Stochastic Optimization. In International Conference on Learning Representations, 2015.

R. Lengagne, P. Fua, and O. Monga. Using Differential Constraints to Reconstruct Complex Surfaces from Stereo. In Conference on Computer Vision and Pattern Recognition, 1997.

R. Lengagne, P. Fua, and O. Monga. 3D Stereo Reconstruction of Human Faces Driven by Differential Constraints. Image and Vision Computing, 18(4):337-343, March 2000.

M. E. Leventon, W. E. Grimson, and O. Faugeras. Statistical Shape Influence in Geodesic Active Contours. In Conference on Computer Vision and Pattern Recognition, pages 316-323, 2000.

J. Liang, N. Homayounfar, W. Ma, Y. Xiong, R. Hu, and R. Urtasun. Polytransform: Deep Polygon Transformer for Instance Segmentation. In Conference on Computer Vision and Pattern Recognition, 2020.

H. Ling, J. Gao, A. Kar, W. Chen, and S. Fidler. Fast Interactive Object Annotation with Curve-Gcn. In Conference on Computer Vision and Pattern Recognition, pages 5257-5266, 2019.

W. E. Lorensen and H. E. Cline. Marching Cubes: A High Resolution 3D Surface Construction Algorithm. In ACM SIGGRAPH, pages 163-169, 1987.

D. Marcos, D. Tuia, B. Kellenberger, and R. Urtasun. Learning Deep Structured Active Contours End-To-End. In Conference on Computer Vision and Pattern Recognition, 2018.

T. Mcinerney and D. Terzopoulos. A Dynamic Finite Element Surface Model for Segmentation and Tracking in Multidimensional Medical Images with Application to Cardiac 4D Image Analysis. Computerized Medical Imaging and Graphics, 19(1):69-83, 1995.

L. Mescheder, M. Oechsle, M. Niemeyer, S. Nowozin, and A. Geiger. Occupancy Networks: Learning 3D Reconstruction in Function Space. In Conference on Computer Vision and Pattern Recognition, pages 4460-4470, 2019.

F. Milletari, N. Navab, and S.-A. Ahmadi. V-Net: Fully Convolutional Neural Networks for Volumetric Medical Image Segmentation. In arXiv Preprint, June 2016.

T. S. Newman and H. Yi. A Survey of the Marching Cubes Algorithm. Computers & Graphics, 30(5):854-879, 2006.

J. Pan and K. Jia. Deep Mesh Reconstruction from Single RGB Images via Topology Modification Networks. In International Conference on Computer Vision, 2019.

J. J. Park, P. Florence, J. Straub, R. A. Newcombe, and S. Lovegrove. Deepsdf: Learning Continuous Signed Distance Functions for Shape Representation. In Conference on Computer Vision and Pattern Recognition, 2019.

S. Peng, W. Jiang, H. Pi, X. Li, H. Bao, and X. Zhou. Deep Snake for Real-Time Instance Segmentation. In Conference on Computer Vision and Pattern Recognition, 2020.

R. Prevost, R. Cuingnet, B. Mory, D. L. D. C., and R. Ardon. Incorporating Shape Variability in Image Segmentation via Implicit Template Deformation. Conference on Medical Image Computing and Computer Assisted Intervention, pages 82-89, 2013.

E. Remelli, A. Lukoianov, S. Richter, B. Guillard, T. Bagautdinov, P. Baque, and P. Fua. Meshsdf: Differentiable Iso-Surface Extraction. In Advances in Neural Information Processing Systems, 2020.

A. Shvets, A. Rakhlin, A. Kalinin, and V. Iglovikov. Automatic Instrument Segmentation in Robot-Assisted Surgery Using Deep Learning. In arXiv Preprint, 2018.

D. Terzopoulos, A. Witkin, and M. Kass. Symmetry-Seeking Models and 3D Object Reconstruction. International Journal of Computer Vision, 1:211-221, 1987.

D. Terzopoulos, A. Witkin, and M. Kass. Constraints on Deformable Models: Recovering 3D Shape and Nonrigid Motion. Artificial Intelligence, 36(1):91-123, 1988.

N. Wang, Y. Zhang, Z. Li, Y. Fu, W. Liu, and Y. Jiang. Pixel2mesh: Generating 3D Mesh Models from Single RGB Images. In European Conference on Computer Vision, 2018.

C. Wen, Y. Zhang, Z. Li, and Y. Fu. Pixel2mesh++: Multi-View 3D Mesh Generation via Deformation. In International Conference on Computer Vision, 2019.

U. Wickramasinghe, E. Remelli, G. Knott, and P. Fua. Voxel2mesh: 3d mesh model generation from volumetric data. In Conference on Medical Image Computing and Computer Assisted Intervention, 2020.

Q. Xu, W. Wang, D. Ceylan, R. Mech, and U. Neumann. DISN: Deep Implicit Surface Network for High-Quality Single-View 3D Reconstruction. In Advances in Neural Information Processing Systems, 2019.

The invention claimed is:

1. A method for enforcing smoothness constraints on surface meshes produced by a Graph Convolutional Neural Network (GCNN), the method performed on a data processor of a computer, the method comprising the steps of:
reading image data from a memory, the image data including two-dimensional image data representing a three-dimensional object or a three-dimensional image stack of the three-dimensional object;
performing a GCNN mesh deformation step on the image data to obtain an approximation of a surface of the three-dimensional object, the surface represented by triangulated surface meshes, at least some vertices of the triangulated surface meshes having a different number of neighboring vertices compared to other vertices in a same triangulated surface mesh; and
performing a deep active surface model (DASM) transformation step on the triangulated surface meshes to obtain a corrected representation of the surface of the three-dimensional object to improve smoothness of the surface,
wherein the DASM transformation step uses a first order and second order derivative at locations of each vertex of the surface of the three-dimensional object to filter out rough edges of the surface.

2. The method of claim 1, wherein the DASM transformation step is performed after a graph convolution step of the GCNN mesh deformation step.

3. The method of claim 2, wherein the step of performing the GCNN mesh deformation step and the step of performing the DASM transformation step are repeated for iterative correction of the surface of the three-dimensional object.

4. The method of claim 1, wherein the DASM transformation step further comprises:
computing different discrete positions around a vertex of triangulated surface meshes, a number of discrete positions being constant irrespective of a number of neighboring vertices of the vertex;
computing surface derivates at the vertex by using the different discrete positions;
defining a cost function by using the computed surface derivatives and the triangulated surface meshes from the step of performing the GCNN mesh deformation;
minimizing the cost function to obtain a corrected representation of the surface.

5. The method of claim 4, wherein the step of minimizing includes a step of iteratively solving a Euler-Lagrange equation associated with the cost function to determine the corrected representation of the surface.

6. The method of claim 1, wherein the DASM transformation step performs a mapping of the approximation of the surface towards the corrected representation of the surface, in which vertices are moved towards the surface that satisfy an associated Euler-Lagrange equation associated with the cost function.

7. The method of claim 1, wherein in the step of reading image data from the memory, the data of three-dimensional image stacks of the three-dimensional object are read, and the three-dimensional image stack includes image body slice data from a medical imaging device.

8. The method of claim 1, further comprising the step of:
displaying a rendered two-dimensional representation or three-dimensional representation of the corrected representation of the surface of the three-dimensional object on a display device.

9. A non-transitory computer readable medium, the computer readable medium having computer-executable code recorded thereon, the computer-executable code configured to perform the method of claim 1 when executed on a computer device.

10. A computer system including a data processor and memory, the computer system configured to perform the method of claim 1.

11. A method for enforcing smoothness constraints on surface meshes produced by a Graph Convolutional Neural Network (GCNN), the method performed on a data processor of a computer, the method comprising the steps of:
reading image data from a memory, the image data including two-dimensional image data representing a three-dimensional object or a three-dimensional image stack of the three-dimensional object;
performing a GCNN mesh deformation step on the image data to obtain an approximation of a surface of the three-dimensional object, the surface represented by triangulated surface meshes, at least some vertices of the triangulated surface meshes having a different number of neighboring vertices compared to other vertices in a same triangulated surface mesh; and
performing a deep active surface model (DASM) transformation step on the triangulated surface meshes to obtain a corrected representation of the surface of the three-dimensional object to improve smoothness of the surface,
wherein the DASM transformation step further comprises:
computing different discrete positions around a vertex of triangulated surface meshes, a number of discrete positions being constant irrespective of a number of neighboring vertices of the vertex;
computing surface derivates at the vertex by using the different discrete positions;
defining a cost function by using the computed surface derivatives and the triangulated surface meshes from the step of performing the GCNN mesh deformation;
minimizing the cost function to obtain a corrected representation of the surface.

12. The method of claim 11, wherein the step of minimizing includes a step of iteratively solving a Euler-Lagrange equation associated with the cost function to determine the corrected representation of the surface.

13. A method for enforcing smoothness constraints on surface meshes produced by a Graph Convolutional Neural Network (GCNN), the method performed on a data processor of a computer, the method comprising the steps of:
reading image data from a memory, the image data including two-dimensional image data representing a three-dimensional object or a three-dimensional image stack of the three-dimensional object;

performing a GCNN mesh deformation step on the image data to obtain an approximation of a surface of the three-dimensional object, the surface represented by triangulated surface meshes, at least some vertices of the triangulated surface meshes having a different number of neighboring vertices compared to other vertices in a same triangulated surface mesh; and performing a deep active surface model (DASM) transformation step on the triangulated surface meshes to obtain a corrected representation of the surface of the three-dimensional object to improve smoothness of the surface, wherein the DASM transformation step performs a mapping of the approximation of the surface towards the corrected representation of the surface, in which vertices are moved towards the surface that satisfy an associated Euler-Lagrange equation associated with the cost function.

* * * * *